United States Patent
Ma et al.

(10) Patent No.: US 11,290,960 B2
(45) Date of Patent: Mar. 29, 2022

(54) METHOD AND APPARATUS FOR LOW POWER TRANSMISSION USING BACKSCATTERING

(71) Applicants: Jianglei Ma, Ottawa (CA); Alireza Bayesteh, Ottawa (CA)

(72) Inventors: Jianglei Ma, Ottawa (CA); Alireza Bayesteh, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 19 days.

(21) Appl. No.: 16/786,340

(22) Filed: Feb. 10, 2020

(65) Prior Publication Data

US 2021/0250868 A1    Aug. 12, 2021

(51) Int. Cl.
*H04W 52/02* (2009.01)

(52) U.S. Cl.
CPC ... *H04W 52/0261* (2013.01); *H04W 52/0212* (2013.01)

(58) Field of Classification Search
CPC ................ H04W 52/0261; H04W 52/0212
USPC ................................ 370/311; 455/572–574
See application file for complete search history.

(56) References Cited

U.S. PATENT DOCUMENTS

| | | | |
|---|---|---|---|
| 2005/0052279 A1* | 3/2005 | Bridgelall | G06K 19/0724 340/10.1 |
| 2008/0315996 A1* | 12/2008 | Domokos | G06K 7/0008 340/10.1 |
| 2016/0092706 A1 | 3/2016 | Deyle | |
| 2019/0025094 A1* | 1/2019 | Lewis | G01D 5/35361 |
| 2019/0141666 A1 | 5/2019 | Luo et al. | |
| 2021/0084251 A1* | 3/2021 | Gollakota | H04L 25/4902 |

FOREIGN PATENT DOCUMENTS

| | | |
|---|---|---|
| CN | 109951200 A | 6/2019 |
| CN | 110174668 A | 8/2019 |
| WO | 2019158187 A1 | 8/2019 |

* cited by examiner

*Primary Examiner* — Michael Y Mapa

(57) ABSTRACT

Aspects of the present application relate to mobile communication devices having active device components and passive device components and, more particularly, to operation of the passive device components to form a backscatter signal from a received forward signal. Upon receipt of the backscatter signal, a reception point may obtain information about the mobile communication device that contains the passive device components. Such information may relate to timing, position and identity.

21 Claims, 20 Drawing Sheets

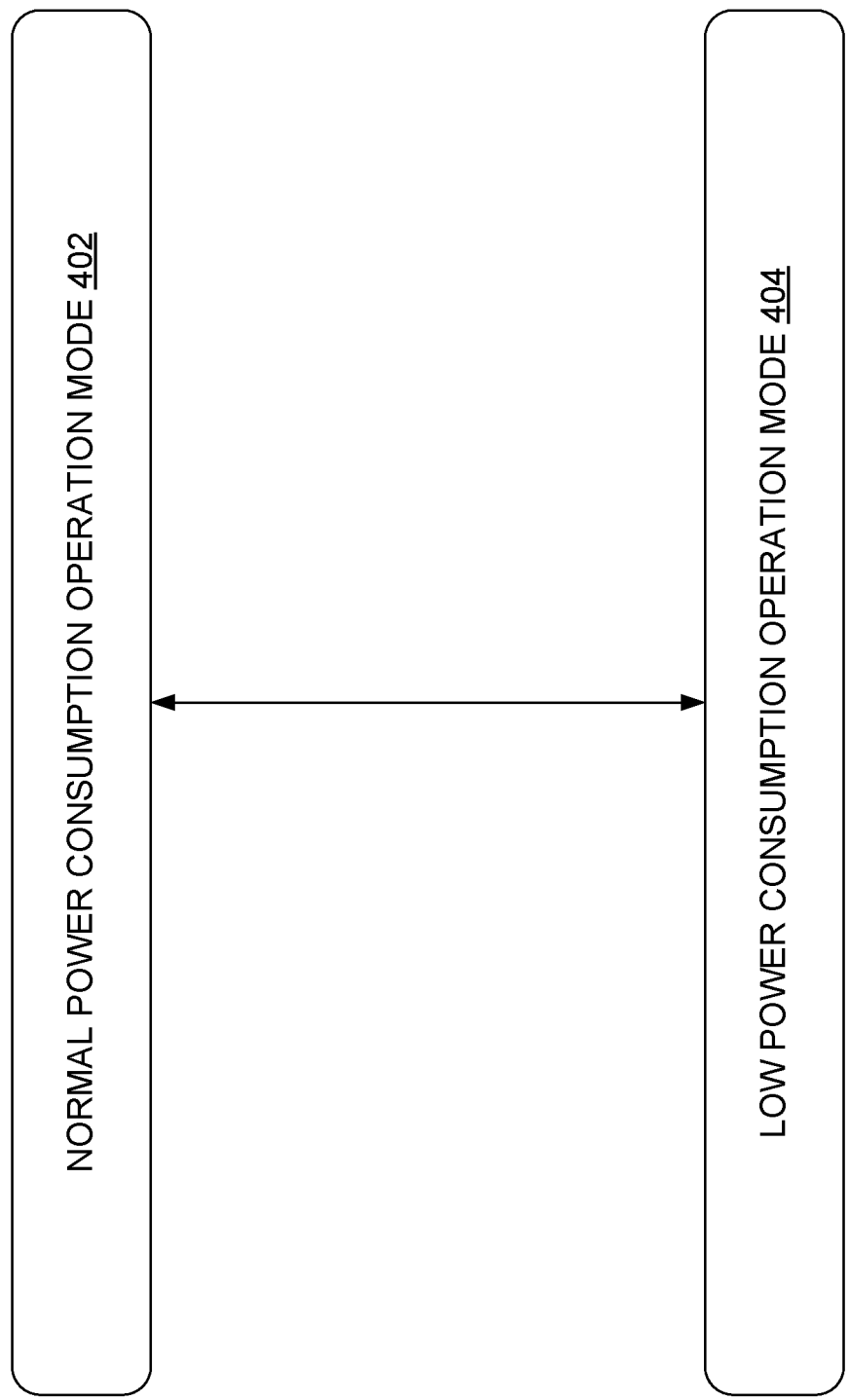

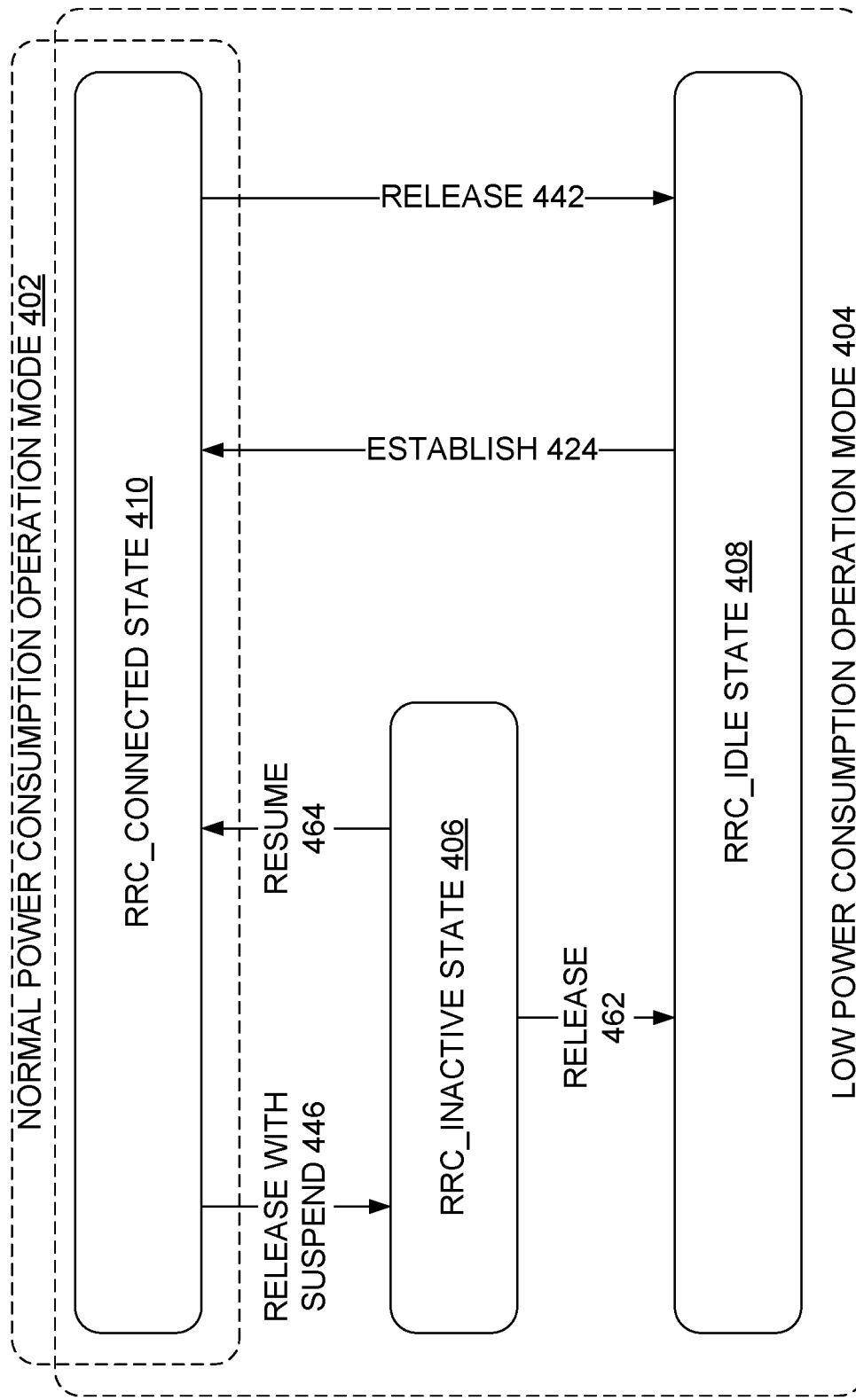

METHOD AND APPARATUS FOR LOW POWER TRANSMISSION USING BACKSCATTERING

TECHNICAL FIELD

The present disclosure relates to low power transmission using backscattering.

BACKGROUND

Mobile communication devices are increasingly ubiquitous. One feature that tends to define mobile communication devices is a rechargeable battery. It is a common feature of modern life that people go to great lengths to achieve longer battery life. From the device designer's perspective, one approach to achieve longer battery life involves increasing the capacity of the battery for a given mobile communication device. Another approach involves a power saving approach, wherein the rate of use of the power available from the battery is, in some way, reduced. The power saving approach may be regarded as more critical for low cost devices, such as different types of sensors with built-in communications.

SUMMARY

Aspects of the present application relate to mobile communication devices having active device components integrated with passive device components and, more particularly, to operation of the passive device components to backscatter a received forward signal. It is assumed that the passive device components will consume less power than the active device components would have consumed while the passive device components perform various functions that would have been performed by the active device components. Conveniently, overall power consumption can be reduced while maintaining, or even enhancing, mobile communication device operation.

According to an aspect of the present disclosure, there is provided a method of operating an electronic device. The method includes receiving, by the electronic device, a first radio frequency (RF) signal, the first RF signal including a time-domain plurality of sub-signals, each sub-signal comprising an RF-upconverted baseband signal, and transmitting, by the electronic device, a second RF signal, the second RF signal being a time-domain function of a contiguous subset of the time-domain plurality of sub-signals in the first RF signal. Additionally, aspects of the present application provide an electronic device for carrying out this method and a computer-readable medium containing instructions for causing a processor in an electronic device to carry out this method.

According to another aspect of the present disclosure, there is provided a method of obtaining information about an electronic device. The method includes transmitting a first radio frequency (RF) signal, the first RF signal including a time-domain plurality of sub-signals, each sub-signal comprising an RF-upconverted baseband signal, and receiving, from an electronic device, a second RF signal, the second RF signal being a time-domain function of a contiguous subset of the time-domain plurality of sub-signals in the first RF signal. The method optionally comprises processing the backscatter signal to obtain information about the electronic device. Additionally, aspects of the present application provide a network device for carrying out this method and a computer-readable medium containing instructions for causing a processor in a network device to carry out this method.

According to a further aspect of the present disclosure, there is provided a network device such as a base station or a transmission and reception point (TRP). The network device includes a memory storing instructions and a processor caused, by executing the instructions, to transmit a first radio frequency (RF) signal, the first RF signal including a time-domain plurality of sub-signals, each sub-signal comprising an RF-upconverted baseband signal and receive, from an electronic device, a second RF signal, the second RF signal being a time-domain function of a contiguous subset of the time-domain plurality of sub-signals in the first RF signal.

According to a still further aspect of the present disclosure, there is provided a computer-readable medium on which is stored instructions for a processor in a combination transmission point and reception point. The instructions, when executed by the processor, cause the processor to transmit a first radio frequency (RF) signal, the first RF signal including a time-domain plurality of sub-signals, each sub-signal comprising an RF-upconverted baseband signal and receive, from an electronic device, a second RF signal, the second RF signal being a time-domain function of a contiguous subset of the time-domain plurality of sub-signals in the first RF signal.

According to an even further aspect of the present disclosure, there is provided a system. The system includes a base station, a transmission point and a reception point. The transmission point transmits a first radio frequency (RF) signal, the first RF signal including a time-domain plurality of sub-signals, each sub-signal comprising an RF-upconverted baseband signal. The reception point receives from an electronic device, a second RF signal, the second RF signal being a time-domain function of a contiguous subset of the time-domain plurality of sub-signals in the first RF signal, and transmits to the base station the second RF signal. The base station processes the second RF signal to obtain information about the electronic device.

In the above aspects, the forward signal may have specific autocorrelation properties. In the above aspects, a network device may associate a cross-correlation value with each time shift value among a plurality of time shift values, the cross-correlation value obtained between the backscatter signal and the forward signal shifted by each time shift value. In the above aspects, a network device may determine a particular time shift value associated with a greatest cross-correlation value among the plurality of cross-correlation values. In the above aspects, a network device may process the particular time shift value to obtain the information about the electronic device. Processing the particular time shift value may comprise: obtaining a value for a relative time difference; and converting the relative time difference to an indication of a position for the electronic device. Processing the particular time shift value may comprise: obtaining indications of boundaries for the contiguous subset of the sub-signals received over the defined duration; and analyzing the boundaries to obtain an indication of a timing for the electronic device.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 4A illustrates a pair of operation modes for the electronic devices of FIG. 1 in accordance with aspects of the present application;

FIG. 4C illustrates a state diagram including three Radio Resource Control states and labelled transitions between the states in the context of the operation modes of FIG. 4A, as an alternative to the illustration of FIG. 4B in accordance with aspects of the present application;

DETAILED DESCRIPTION OF ILLUSTRATIVE EMBODIMENTS

For illustrative purposes, specific example embodiments will now be explained in greater detail in conjunction with the figures.

Figure 1:
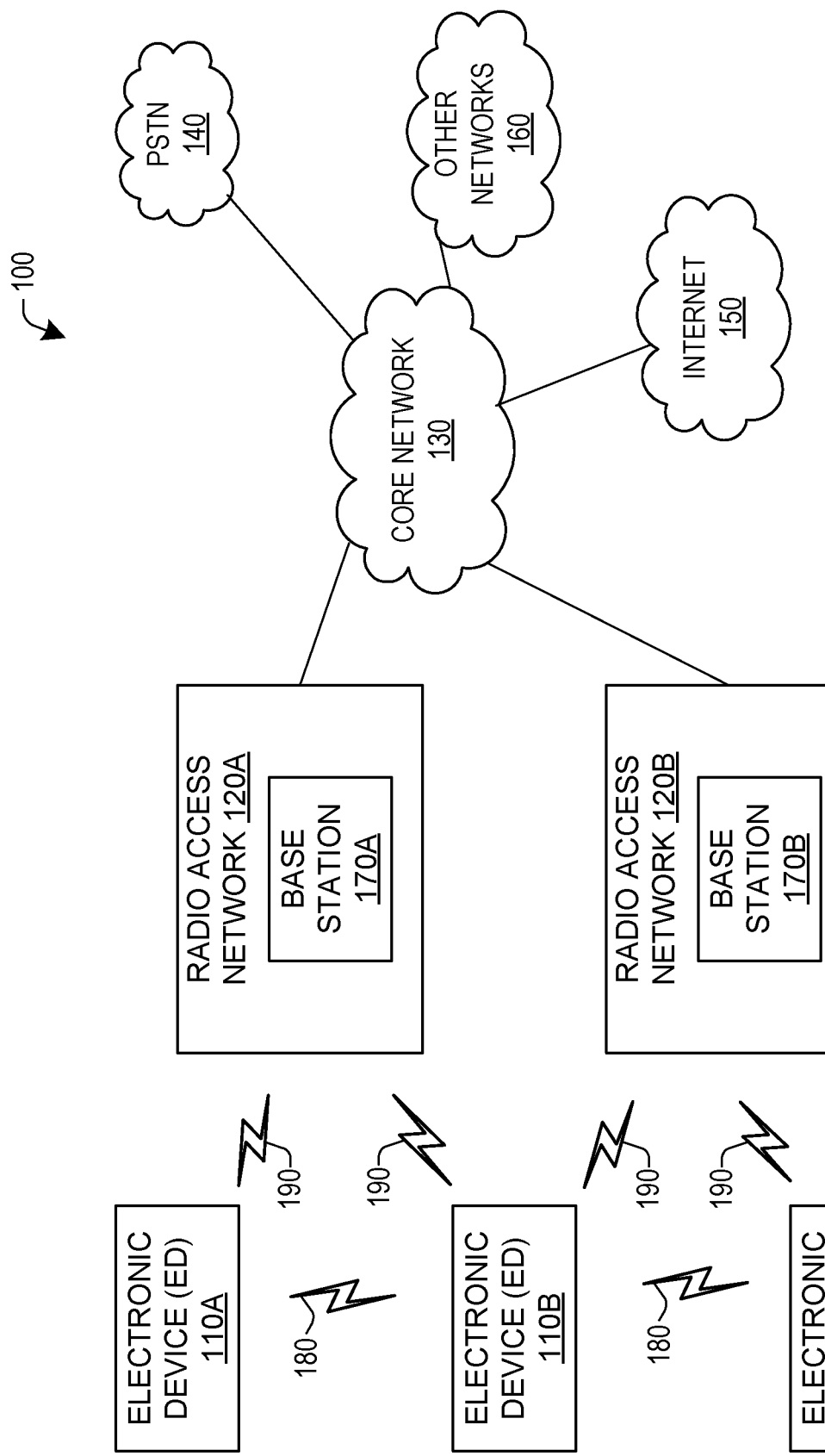
FIG. 1 illustrates, in a schematic diagram, a communication system in which embodiments of the disclosure may occur, the communication system includes example electronic devices and an example base station.
Figure 2:
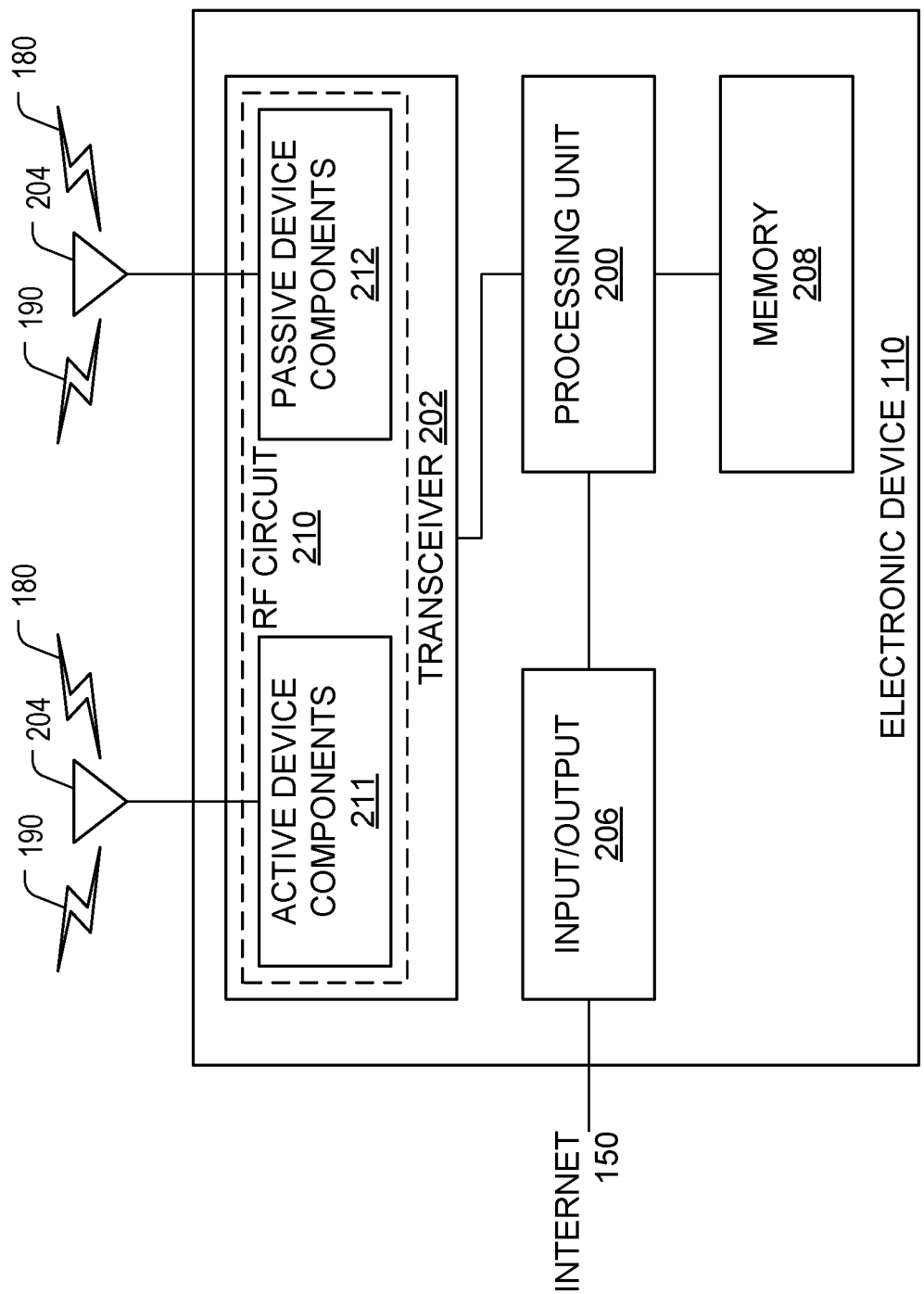
FIG. 2 illustrates, as a block diagram, an example electronic device of FIG. 1, according to aspects of the present disclosure.
Figure 3:
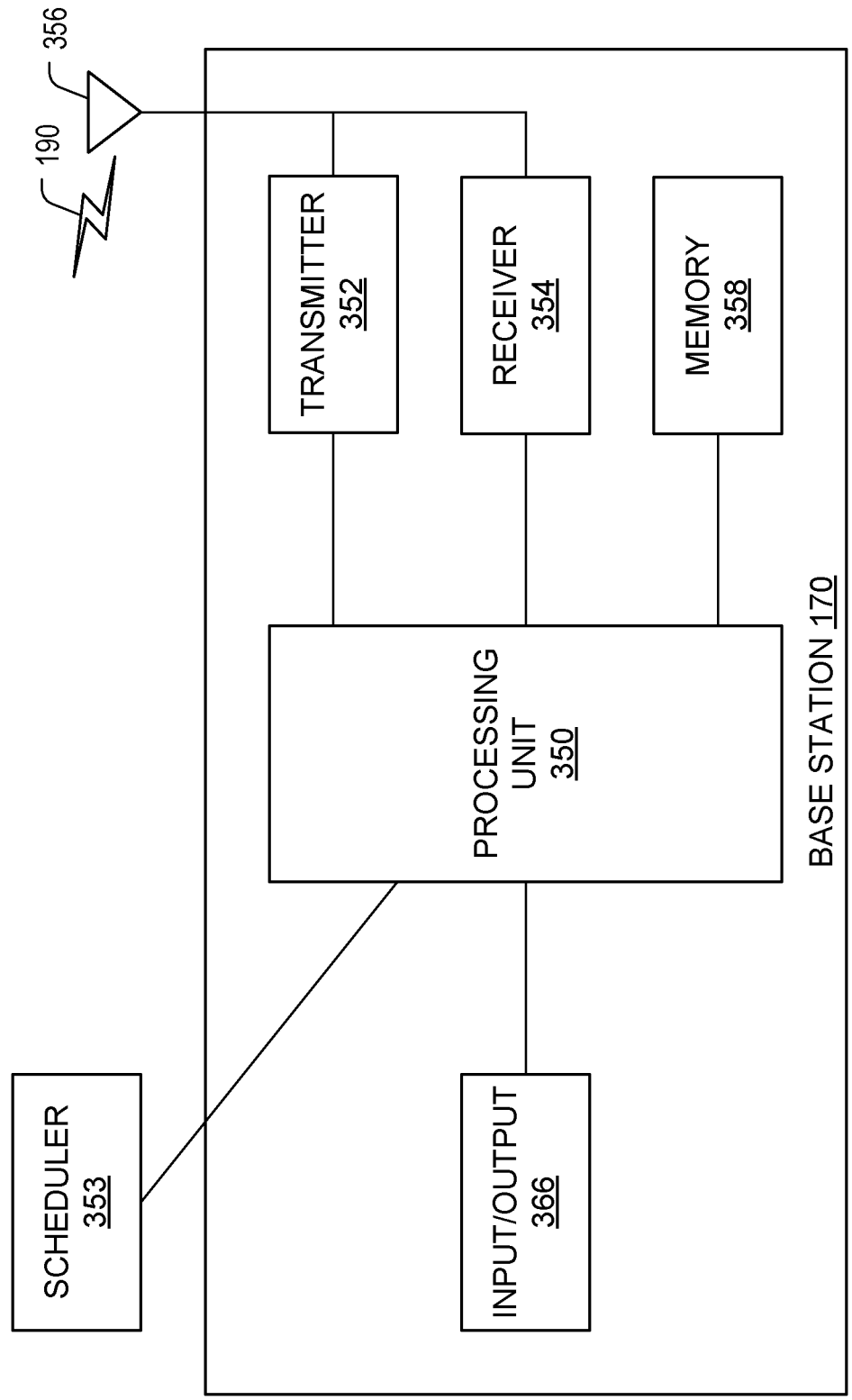
FIG. 3 illustrates, as a block diagram, the example base station of FIG. 1, according to aspects of the present disclosure.

FIGS. 1, 2 and 3 illustrate examples of networks and devices that could implement any or all aspects of the present disclosure.

FIG. 1 illustrates an example communication system 100. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources, such as bandwidth.

In this example, the communication system 100 includes a first electronic device (ED) 110A, a second ED 110B and a third ED 110C (individually or collectively 110), a first radio access network (RAN) 120A and a second RAN 120B (individually or collectively 120), a core network 130, a public switched telephone network (PSTN) 140, the Internet 150 and other networks 160. Although certain numbers of these components or elements are shown in FIG. 1, any reasonable number of these components or elements may be included in the communication system 100.

The EDs 110 are configured to operate, communicate, or both, in the communication system 100. For example, the EDs 110 are configured to transmit, receive, or both via wireless communication channels. Each ED 110 represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), Internet of Things (IoT) device, personal digital assistant (PDA), smartphone, laptop, computer, touchpad, wireless sensor, or consumer electronics device.

In FIG. 1, the first RAN 120A includes a first base station 170A and the second RAN includes a second base station 170B (individually or collectively 170). Each base station 170 is configured to wirelessly interface with one or more of the EDs 110 to enable access to any other base station 170, the core network 130, the PSTN 140, the internet 150 and/or the other networks 160. For example, the base stations 170 may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP) or a wireless router. Any ED 110 may be alternatively or additionally be configured to interface, access or communicate with any other base station 170, the internet 150, the core network 130, the PSTN 140, the other networks 160 or any combination of the preceding. The communication system 100 may include RANs, such as the RAN 120B, wherein the corresponding base station 170B accesses the core network 130 via the internet 150, as shown.

The EDs 110 and the base stations 170 are examples of communication equipment that can be configured to implement some or all of the functionality and/or embodiments described herein. In the embodiment shown in FIG. 1, the first base station 170A forms part of the first RAN 120A, which may include other base stations (not shown), base station controller(s) (BSC, not shown), radio network controller(s) (RNC, not shown), relay nodes (not shown), elements (not shown) and/or devices (not shown). Any base station 170 may be a single element, as shown, or multiple elements, distributed in the corresponding RAN 120, or otherwise. Also, the second base station 170B forms part of the second RAN 120B, which may include other base stations, elements and/or devices. Each base station 170 transmits and/or receives wireless signals within a particular geographic region or area, sometimes referred to as a "cell" or "coverage area." A cell may be further divided into cell sectors and a base station 170 may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RANs 120 shown is exemplary only. Any number of RANs may be contemplated when devising the communication system 100.

The base stations 170 communicate with one or more of the EDs 110 over one or more air interfaces 190 using wireless communication links, e.g., radio frequency (RF) wireless communication links, microwave wireless communication links, infrared (IR) wireless communication links, visible light (VL) communications links, etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA) or single-carrier FDMA (SC-FDMA) in the air interfaces 190.

A base station 170 may implement Universal Mobile Telecommunication System (UMTS) Terrestrial Radio Access (UTRA) to establish the air interface 190 using wideband CDMA (WCDMA). In doing so, the base station 170 may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170 may establish the air interface 190 with Evolved UTMS Terrestrial Radio Access (E-UTRA) using LTE, LTE-A, LTE-B and/or 5G New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE and GERAN. Of course, other multiple access schemes and wireless protocols may be utilized.

The RANs 120 are in communication with the core network 130 to provide the EDs 110 with various services such as voice communication services, data communication services and other communication services. The RANs 120 and/or the core network 130 may be in direct or indirect communication with one or more other RANs (not shown), which may or may not be directly served by the core network 130 and may or may not employ the same radio access technology as the first RAN 120A, the second RAN 120B or both. The core network 130 may also serve as a gateway access between (i) the RANs 120 or EDs 110 or both, and (ii) other networks (such as the PSTN 140, the Internet 150 and the other networks 160).

The EDs 110 may communicate with one another over one or more sidelink (SL) air interfaces 180 using wireless communication links, e.g., radio frequency (RF) wireless communication links, microwave wireless communication links, infrared (IR) wireless communication links, visible light (VL) communications links, etc. The SL air interfaces 180 may utilize any suitable radio access technology and may be substantially similar to the air interfaces 190 over which the EDs 110 communication with one or more of the base stations 170 or they may be substantially different. For example, the communication system 100 may implement one or more channel access methods, such as CDMA, TDMA, FDMA, OFDMA or SC-FDMA in the SL air interfaces 180. In some embodiments, the SL air interfaces 180 may be, at least in part, implemented over unlicensed spectrum.

Some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or a switch (not shown) and to the Internet 150. The PSTN 140 may include circuit switched telephone networks for providing plain old telephone service (POTS). The Internet 150 may include a network of computers and subnets (intranets) or both and incorporate protocols, such as internet protocol (IP), transmission control protocol (TCP) and user datagram protocol (UDP). The EDs 110 may be multimode devices capable of operation according to multiple radio access technologies and incorporate multiple transceivers necessary to support multiple radio access technologies.

FIG. 2 illustrates example components that may implement the methods and teachings according to the present disclosure. In particular, FIG. 2 illustrates an example ED 110. These components could be used in the communication system 100 or in any other suitable system.

As shown in FIG. 2, the ED 110 includes at least one processor or processing unit 200. The processing unit 200 implements various processing operations of the ED 110. For example, the processing unit 200 could perform signal coding, bit scrambling, data processing, power control, input/output processing, or any other functionality, thereby enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, a microcontroller, a digital signal processor, a field programmable gate array or an application specific integrated circuit.

The ED 110 also includes at least one transceiver 202. The transceiver 202 includes an RF circuit 210 that is configured to modulate data or other content for transmission by at least one antenna 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna among the at least one antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The RF circuit 210 is illustrated as including a set of active device components 211 connected to one of the antennas 204. In addition, the RF circuit 210 is illustrated as including a set of passive device components 212 connected to an associated one of the antennas 204.

The term "passive," as used herein in the phrase "passive device components," bears clarification. In a typical discussion of electronic components, the term "passive" is given to those electronic components that lack an ability to control electric current by means of another electrical signal. Examples of passive electronic components are capacitors, resistors, inductors, transformers and some diodes. In contrast, the term "active" is given to those electronic components that can control the flow of electricity by means of another electrical signal. Some examples of active electronic components are transistors, vacuum tubes and silicon-controlled rectifiers.

In a discussion of electronic components in the present application, the term "passive" is given to those electronic components that lack a requirement for conversion to baseband when receiving or transmitting signals. In contrast, the term "active" is given to those electronic components that employ conversion to baseband when receiving or transmitting. In other words, the "passive" circuits of the present application may, in some examples, consist of only those electronic components that lack an ability to control electric current by means of another electrical signal, and in some other examples, may further comprise those electronic components that can control the flow of electricity by means of another electrical signal. Conveniently, passive device components 212 are configured to perform their functions in the RF domain in contrast to the active device components 211, which are configured to perform their functions in the baseband domain. As a consequence, the power consumption level of the passive device components 212 is very low relative to the power consumption level of the active device components 211.

In accordance with aspects of the present application, the processing unit 200 of the electronic device 110 may cause the passive device components 212 to perform certain functions known to be performed by the active device components 211, thereby reducing overall power consumption. Indeed, the amount by which the overall power consumption is expected to be reduced is roughly the power consumption associated with the active device components 211 performing the certain functions.

The ED 110 further includes one or more input/output devices 206 or interfaces (such as a wired interface to the Internet 150). The input/output devices 206 permit interaction with a user or other devices in the network. Each input/output device 206 includes any suitable structure for providing information to, or receiving information from, a user, such as a speaker, a microphone, a keypad, a keyboard, a display or a touch screen, including network interface communications.

In addition, the ED 110 includes at least one memory 208. The memory 208 stores instructions and data used, generated or collected by the ED 110. For example, the memory 208 could store software instructions or modules configured to implement some or all of the functionality and/or embodiments described herein and that are executed by the processing unit 200. Each memory 208 includes any suitable volatile and/or non-volatile storage and retrieval device. Any suitable type of memory may be used, such as a random access memory (RAM), a read only memory (ROM), a hard disk, an optical disc, a subscriber identity module (SIM) card, a memory stick, a secure digital (SD) memory card and the like.

As illustrated in FIG. 3, the base station 170 includes at least one processing unit 350, at least one transmitter 352, at least one receiver 354, one or more antennas 356, at least one memory 358 and one or more input/output devices or interfaces 366. A transceiver (not shown) may be used instead of the transmitter 352 and receiver 354. A scheduler 353 may be coupled to the processing unit 350. The scheduler 353 may be included within, or operated separately from, the base station 170. The processing unit 350 implements various processing operations of the base station 170, such as signal coding, bit scrambling, data processing, power control, input/output processing or any other functionality. The processing unit 350 can also be configured to implement some or all of the functionality and/or embodiments described in more detail above. Each processing unit 350 includes any suitable processing or computing device configured to perform one or more operations. Each processing unit 350 could, for example, include a microprocessor, a microcontroller, a digital signal processor, a field programmable gate array or an application specific integrated circuit.

Each transmitter 352 includes any suitable structure for generating signals for wireless or wired transmission to one or more EDs 110 or other devices. Each receiver 354 includes any suitable structure for processing signals received wirelessly or by wire from one or more EDs 110 or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter 352 and one or more separate antennas 356 could be coupled to the receiver 354. Each memory 358 includes any suitable volatile and/or non-volatile storage and retrieval device(s) such as those described above in connection to the ED 110. The memory 358 stores instructions and data used, generated or collected by the base station 170. For example, the memory 358 could store software instructions or modules configured to implement some or all of the functionality and/or embodiments described above and that are executed by the processing unit 350.

Each input/output device 366 permits interaction with a user or other devices in the network. Each input/output device 366 includes any suitable structure for providing information to or receiving/providing information from a user, including network interface communications.

Additional details regarding the ED 110 and the base stations 170 are known to those of skill in the art. As such, these details are omitted here for clarity.

Different mechanisms for reducing the rate of power use have been studied by people involved in the known 3rd Generation Partnership Project (3GPP). Such mechanisms include strategies that aim to reduce an "active" time of mobile communication devices.

An ED 110 can operate in a variety of modes in order to trade off certain features for more or less device power consumption and/or network resource consumption. Two example modes are illustrated in FIG. 4A along with an indication of a transition between the modes. In particular, FIG. 4A illustrates a normal power consumption operation mode 402 and a low power consumption operation mode 404.

The functionalities that can be enabled using backscattering communications, when the ED 110 is in the low power consumption operation mode 404, include: allowing a network entity to track a relative position for the ED 110; allowing the network entity to maintain a timing reference for the ED 110; allowing the network entity to identify the ED 110; and allowing the network entity to get some other information about the ED 110, including preamble and data. Conveniently, an approach wherein backscattering communications is used for allowing the network entity to track relative device position, maintain timing references and identify devices, may be seen as particularly suitable for extremely low cost Internet-of-Things (IoT) devices.

In 3GPP New Radio (NR), each UE may operate in one of several modes known as Radio Resource Control (RRC) states. Accordingly, a UE (such as the ED 110) may operate in one of the following three RRC states, illustrated in FIG. 4B: an RRC_IDLE state 408; an RRC_CONNECTED state 410; and an RRC_INACTIVE state 406. In other documentation, these states may be referenced as "modes", for example, "RRC_IDLE mode." When the ED 110 is in the RRC_CONNECTED state 410, the ED 110 may be considered to have been connected to the network as a result of a connection establishment procedure 424. When the ED 110 has transitioned to the RRC_IDLE state 408, say, by way of a release procedure 442 or by way of a release procedure 462, the ED 110 is not connected to the network, but the network knows that the ED 110 is present in the network. By switching to the RRC_INACTIVE state 406 by way of a release with suspend procedure 446, the ED 110 helps conserve network resources and local power (thereby lengthening, for example, perceived battery life of the ED 110). The RRC_INACTIVE state 406 may be useful, for example, in those instances when the ED 110 is not communicating with the network. When a ED 110 is in the RRC_INACTIVE state 406, the ED 110 is also helping to conserve network resources and local power. However, when the ED 110 is in the RRC_INACTIVE state 406, the network and the ED 110 both store at least some configuration information to, thereby, allow the ED 110 to reconnect to the network, by way of a resume procedure 464, more rapidly than the ED 110 would be able to reconnect, by way of the connection establishment procedure 424, in the case wherein the ED 110 is in the RRC_IDLE state 408. The storage of at least some configuration information when the ED 110 is in the RRC_INACTIVE state 406 is one aspect that distinguishes the RRC_INACTIVE state 406 from the RRC_IDLE state 408. Notably, the acronym RRC is a reference to the known Radio Resource Control protocol.

Figure 4B:
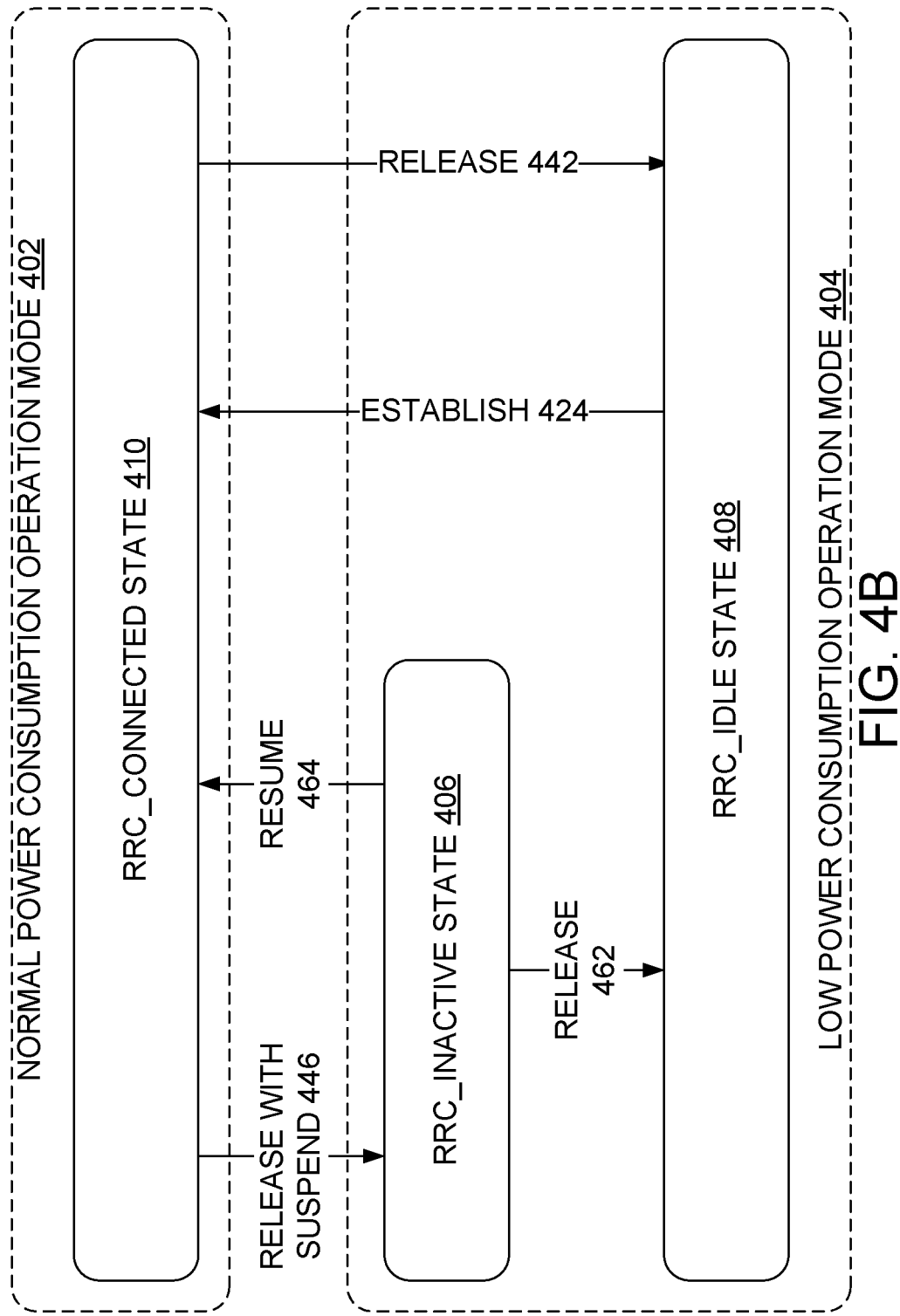
FIG. 4B illustrates a state diagram including three Radio Resource Control states and labelled transitions between the states in the context of the operation modes of FIG. 4A in accordance with aspects of the present application.

FIG. 4B illustrates the normal power consumption operation mode 402 and the low power consumption operation mode 404 introduced in FIG. 4A. In the configuration illustrated in FIG. 4B, the normal power consumption operation mode 402 includes the RRC_CONNECTED state 410 and the low power consumption operation mode 404 includes the RRC_IDLE state 408 and the RRC_INACTIVE state 406. Accordingly, one way to reduce an "active" time of mobile communication devices, in the 3GPP NR context, is to reduce a time that the ED 110 spends in the RRC_CONNECTED state 410.

FIG. 4C illustrates the normal power consumption operation mode 402 and the low power consumption operation mode 404 introduced in FIG. 4A. In the configuration illustrated in FIG. 4C, the normal power consumption operation mode 402 includes the RRC_CONNECTED state 410 and the low power consumption operation mode 404 includes the RRC_CONNECTED state 410, the RRC_IDLE state 408 and the RRC_INACTIVE state 406. Accordingly, the task of reducing an "active" time of mobile communication devices, in the 3GPP NR context, is more complex than simply reducing a time that the ED 110 spends in the RRC_CONNECTED state 410.

To reduce the power consumption by the electronic devices 110 in the communication system 100 of FIG. 1, aspects of the present application relate to the use of the passive device components 212 in the electronic devices 110 to carry out tasks often carried out by the active device components 211. The passive device components 212 are configured to perform specific functions typically performed by the active device components 211, thereby allowing the active device components 211 to remain powered off for longer periods. The expected result of allowing the active device components 211 to remain powered off for longer periods is that power consumption at the ED 110 will be reduced.

The passive device components 212 may perform the specific functions using so-called backscattering communications. A well-known example of a backscattering communication application is known as radio frequency identification (RFID).

Figure 5A:
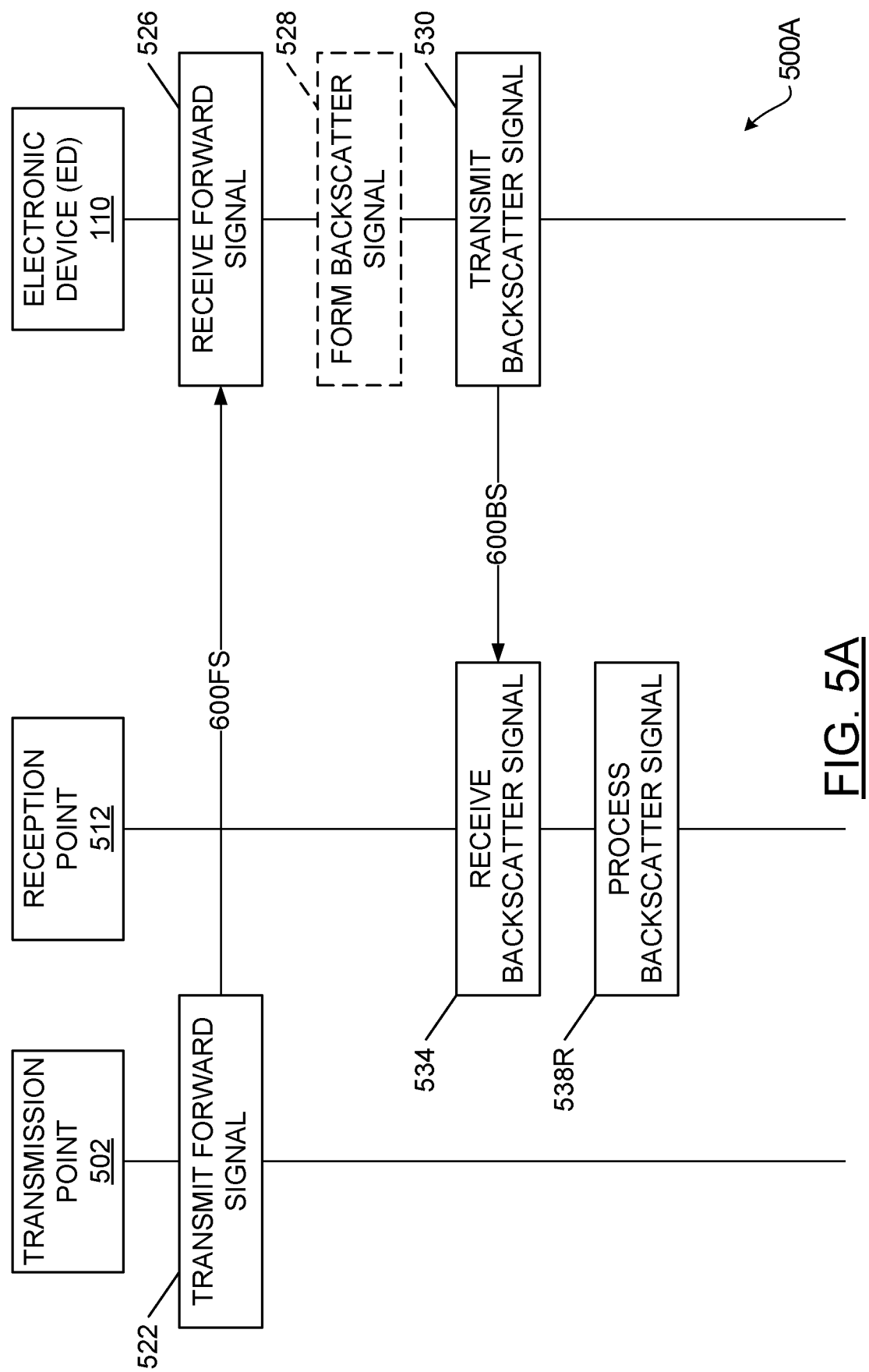
FIG. 5A illustrates, in a flow diagram, a simplified version of the communication system of FIG. 1, the flow extends between an electronic device, a transmission point and a reception point in accordance with aspects of the present application.

FIG. 5A illustrates a flow diagram 500A suitable for reviewing aspects of the present application. The flow diagram 500A may be considered to be a simplified version of the communication system 100 of FIG. 1 in that FIG. 5A includes one of the electronic devices 110 from FIG. 1, a transmission point 502, a reception point 512 (which may also be called a "reader") and one of the base stations 170 from FIG. 1. As illustrated in FIG. 5A, the reception point 512 and the transmission point 502 are separate devices, located apart from one another. Notably, the reception point 512 and the transmission point 502 may be part of a single device, such as one of the base stations 170. Furthermore, the reception point 512 and the transmission point 502 may be co-located, but distinct from one of the base stations 170. In an instance wherein the reception point 512 is located away from the base station 170, the reception point 512 may maintain a communication channel with the base station 170. The communication channel between the reception point 512 and the base station 170 may be wired or wireless. In other aspects of the present application, the reception point 512 may maintain a communication channel with a network node that is not the base station 170.

In overview, and in view of a flow diagram 500A illustrated in FIG. 5A, the transmission point 502 transmits (step 522) a radio frequency signal 600FS (a so-called "forward signal") on a forward channel. The forward signal 600FS may comprise a plurality of sub-signals (e.g., a-symbols). The ED 110 receives (step 526) the forward signal 600FS, forms (step 528) a radio frequency backscatter signal and transmits (step 530) the backscatter signal 600BS over a back channel. At the ED 110, the forming (step 528) of the backscatter signal 600BS may involve use of the passive device components 212 of the ED 110. The backscatter signal 600BS may be defined as a time-restricted (e.g., restricted to a single p-slot) set of contiguous sub-signals among the plurality of sub-signals included in the forward signal 600FS. The ED 110 may transmit (step 530) the backscatter signal 600BS over a defined duration (e.g., a p-slot). The operation of transmitting (step 530) the radio frequency backscatter signal may occur subsequent to the operation of forming (step 528) the backscatter signal 600BS through modification of the forward signal 600FS in the RF domain performed under control of the processing unit 200. In some embodiments, this modification is implemented by applying amplitude and/or phase changes on the forward signal 600FS through adjusting the impedance in the passive device components 212 of the RF circuit 210 (see FIG. 2). In some embodiments, the modification may also include not reflecting the forward signal 600FS over one p-symbol or a plurality of p-symbols. In some embodiments, the backscatter signal 600BS is merely a reflection of the forward signal 600FS over one p-symbol or a plurality of p-symbols. That is, the passive device components 212 need not necessarily modify the forward signal 600FS to form the backscatter signal 600BS. Instead, the passive device components 212 may merely time-limit transmission of the backscatter signal 600BS.

Subsequent to the transmission (step 530) of the backscatter signal 600BS by the ED 110, the reception point 512 receives (step 534) the backscatter signal 600BS over the back channel. The reception point 512 processes (step 538) the backscatter signal 600BS to obtain information.

Figure 5B:
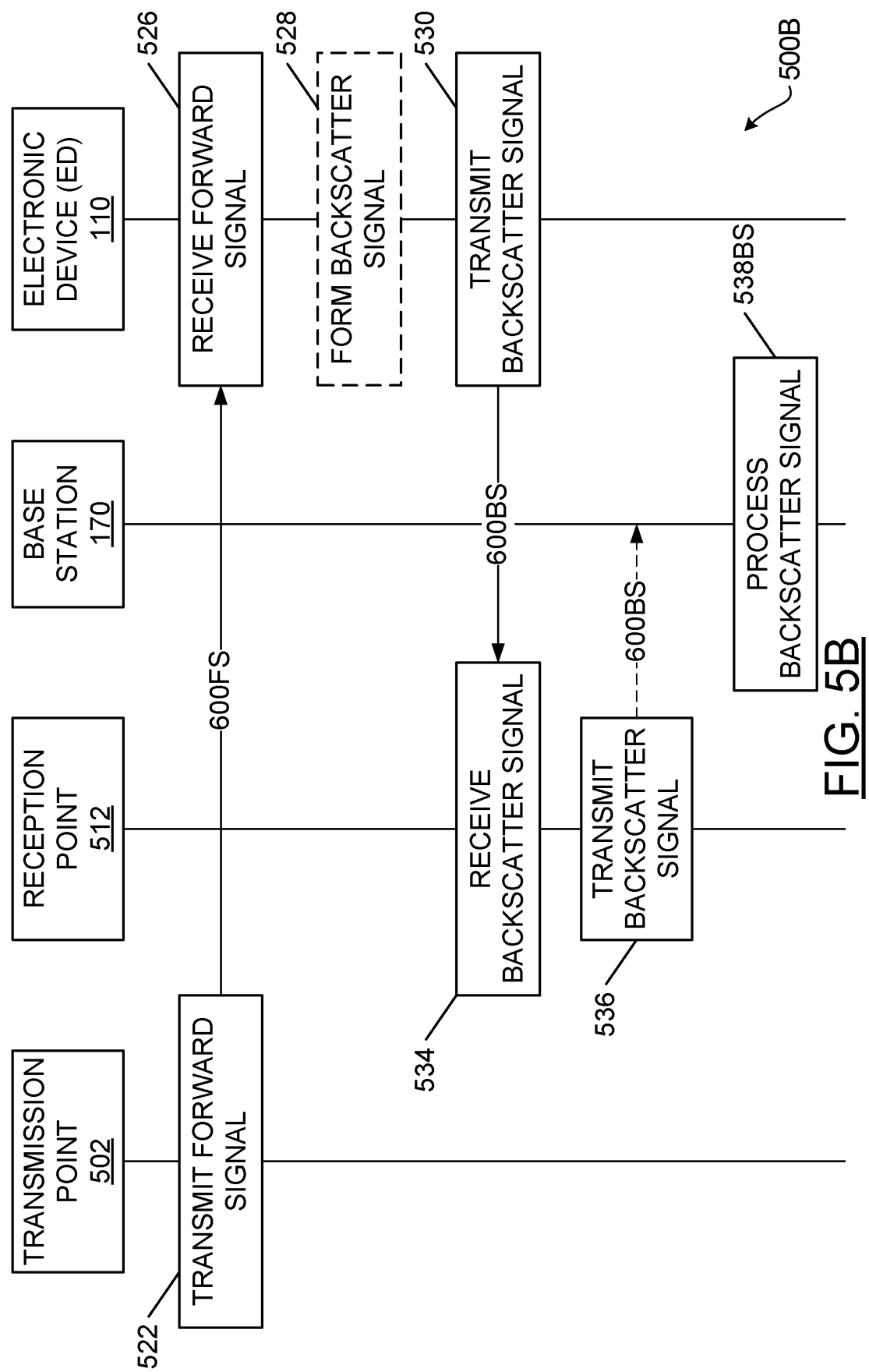
FIG. 5B illustrates, in a flow diagram, a simplified version of the communication system of FIG. 1, the flow extends between an electronic device, a transmission point, a reception point and a base station in accordance with aspects of the present application.

In other aspects of the present application, and in view of a flow diagram 500B illustrated in FIG. 5B, the reception point 512 may transmit (step 536), over a communication channel, the received backscatter signal 600BS to the base station 170 and the base station 170 may perform at least a part of the processing (step 538BS) of the backscatter signal 600BS.

Figure 5C:
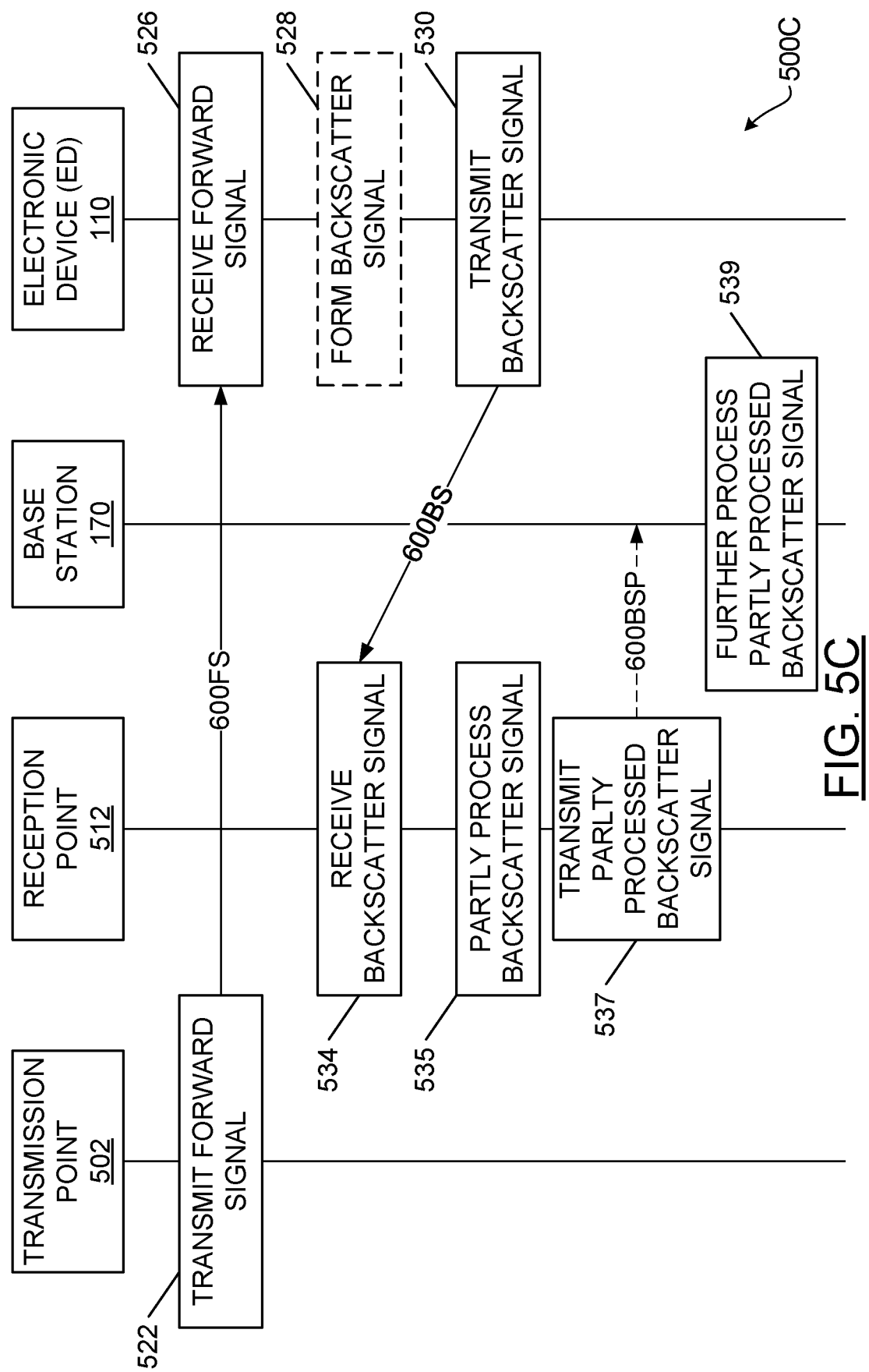
FIG. 5C illustrates, in a flow diagram, a simplified version of the communication system of FIG. 1, the flow extends between an electronic device, a transmission point, a reception point and a base station in accordance with aspects of the present application.

In some embodiments, and in view of a flow diagram 500C illustrated in FIG. 5C, the reception point 512 may perform some processing (step 535) on the backscatter signal 600BS and transmit (step 537), over the communication channel, a partly processed backscatter signal 600BSP to the base station 170, thereby allowing the base station 170 to perform some further processing (step 539).

When designing the forward signal 600FS, consideration is given to resource allocation. The primary resources that are available for allocation are time resources and frequency resources. Determining a manner in which to allocate these resources may be considered to depend on the application, that is, the desired functionality of the backscatter signal.

In one example application, the desired functionality of the backscatter signal is to allow the reception point 512 to accurately determine a position for the ED 110. For this application, it is preferred to design the forward signal 600FS to have a wide frequency bandwidth. It may also be preferred that time resources are narrowly allocated to allow more granularity in the time domain processing.

In another example application, wherein the ED 110 is in a location with limited coverage, it is preferred to design the forward signal 600FS to have a narrow frequency bandwidth and allocate relatively large time slots.

One aspect of the forward signal design is the waveform design. Examples of waveforms include single-carrier, multi-carrier, ultra-wide band (UWB) pulse, Frequency-Modulated Continuous Wave (FMCW), or the like. Multi-carrier waveforms include cyclic prefix (CP)-OFDM and single-carrier (SC)-FDMA.

Waveform design for the forward signal 600FS may depend on the required performance metric. For example, if very accurate timing acquisition and positioning for ED 110 is required, waveforms with fine timing granularity and good autocorrelation in time domain are preferable. Examples include single-carrier and UWB pulse waveforms. Good autocorrelation means delta-like autocorrelation function $R(\tau)$ which has a peak at $\tau=0$ and very low values for other values of $\tau$.

In some embodiments, the waveform design may also depend on whether or not the forward signal 600FS contains any data for any ED (ED 110 or any other ED in the range of the forward signal 600FS). In the case wherein the forward signal 600FS contains data, waveforms allowing more efficient modulating and demodulating the data are preferable. Examples of waveforms that allow for efficient modulating and demodulating of the data include CP-OFDM and SC-FDMA.

In some other embodiments, other metrics like power efficiency of the transmitter may be considered in the forward signal waveform design. In this case, the waveforms with a low peak-to-average-power ratio (low-PAPR) property would be preferred. Examples of low-PAPR waveforms include single carrier waveforms and SC-FDMA.

A forward signal 600FS may be said to have a frame structure. As such, forward signal design may be referenced as frame structure design. Two "levels" of frame structure design are considered herein.

A first level of the frame structure may be called "passive slots" or "p-slots." Passive slots are arranged to have a time granularity that allows for signal processing and backscatter signal transmission to be carried out by the passive device components.

A second level of the frame structure may be called "active slots," "active symbols," "a-slots" or "a-symbols." Within each p-slot, there can be multiple a-slots carrying regular transmission, perhaps for consumption by other, more active, devices. Each a-slot can contain multiple a-symbols. Such a frame structure design should be familiar from 3GPP NR. A "regular" transmission may be one or more baseband signals that have been upconverted to RF for transmission over an air interface. In other words, first a baseband signal is generated. Next, the baseband signal is upconverted in the frequency domain by multiplying by a sinusoidal signal with a carrier frequency. Notably, the backscattering operation in the present disclosure occurs entirely in the RF domain. That is, the passive device components 212 do not convert a received signal to the baseband domain. Accordingly, the passive device components 212 have no access to the information encoded in signals in the baseband domain.

In a manner consistent with design of other signals, the designing of forward signals includes consideration of generally configuring numerology, which may include specifically configuring sub-carrier spacing. Indeed, appropriately configuring numerology for the forward signal 600FS allows the reception point 512, the intended receiver of the backscatter signal, to obtain information by processing the backscatter signal. Notably, even though multiple a-slots carrying information may be found within a p-slot, the passive device components of the ED 110 are not configured to obtain any of the information transmitted in the a-slots. That is, the ED 110 operating in accordance with aspects of the present application may be seen to eschew baseband processing of the a-slots and analog to digital conversion. It follows that the ED 110 only transmits (step 530) information to the reception point 512 by backscattering a signal received from the transmission point 502. Configuration parameters that define the duration of a p-slot, the duration of an a-slot and the numerology of the forward signal 600FS may be provided to the transmission point 502 by an entity in the environment 100 of FIG. 1. The configuration parameters of the forward signal 600FS may also be provided to the ED 110 by an entity in the environment 100 of FIG. 1.

In typical operation, a base station 170 communicates with an ED 110 that is operating in the RRC_CONNECTED state 410. Perhaps responsive to a received instruction from the base station 170, the ED 110 may use active components to generate a transmission, such as a Sounding Reference Signal transmission or a Preamble transmission. Upon receipt of the transmission, the base station 170 is expected to be able to acquire information related to identity, timing and positioning for the ED 110. However, it may be considered difficult to obtain the same information for the ED 110 when the ED 110 is not in the RRC_CONNECTED state 410.

In operation according to the aspects of the present application that relate to enhancing the ability of the reception point 512 to acquire information related to identity, timing and positioning when the ED 110 is not operating in the normal power consumption operation mode 402, the transmission point 502 transmits a forward signal 600FS that has been designed to facilitate obtaining such information by the reception point 512.

Figure 6:
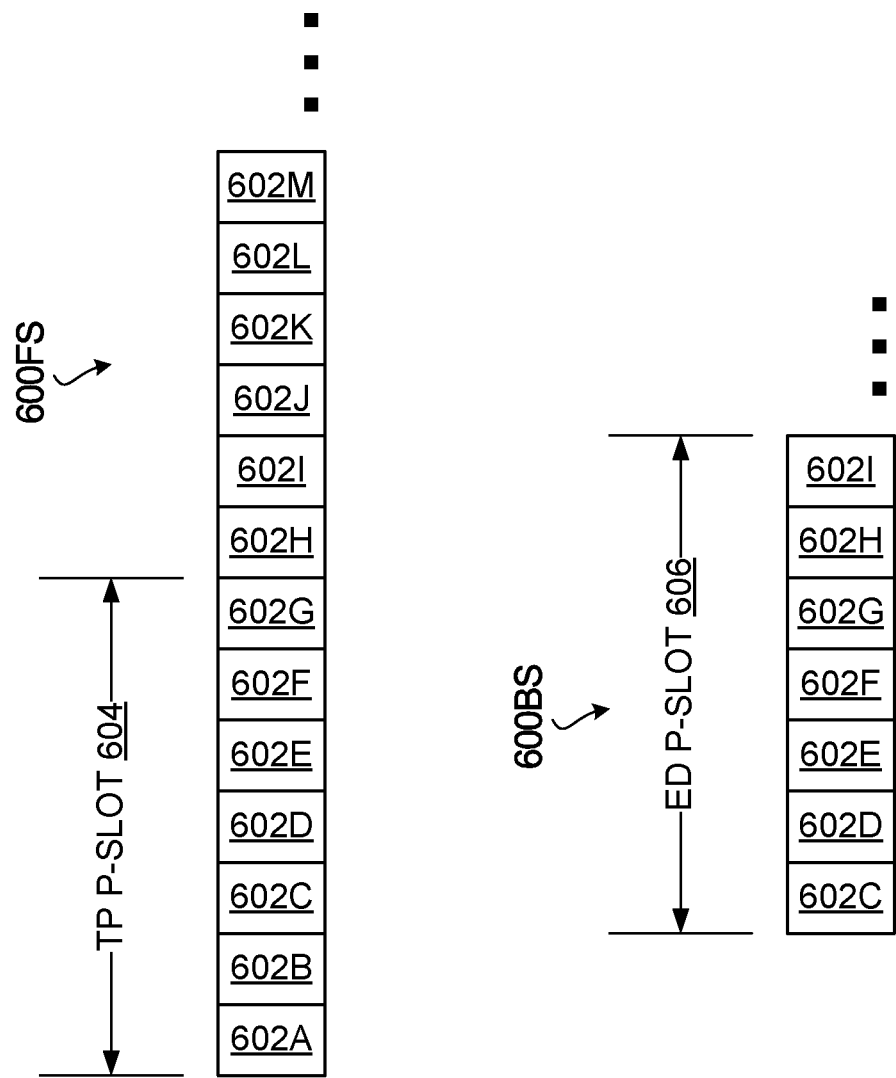
FIG. 6 illustrates a forward signal and a corresponding backscatter signal, according to aspects of the present disclosure.

According to aspects of the present application, the forward signal 600FS may be designed to use a waveform and numerology that features fine granularity in the time domain. FIG. 6 illustrates a forward signal 600FS and a corresponding backscatter signal 600BS. The forward signal 600FS includes a plurality of transmitted a-slots 602A, 602B, 602C, 602D, 602E, 602F, 602G, 602H, 602I, 602J, 602K, 602L and 602M (individually or collectively 602). The backscatter signal 600BS includes a time-restricted set of the contiguous a-slots 602 in the forward signal 600FS. Indeed, in the example of FIG. 6, the backscatter signal 600BS includes only a-slots 602C, 602D, 602E, 602F, 602G, 602H and 602I. In a beneficial method of operation, the ED 110 transmits the backscatter signal 600BS without awareness of the a-slots incorporated therein.

The ED 110 transmits (step 530, FIG. 5A) backscattering transmission while the ED 110 is not in the normal power consumption operation mode 402. The backscattering transmission is based on p-slot timing that is specific to the ED 110. For example, FIG. 6 illustrates an ED p-slot 606 that starts at the beginning of a-slot 602C and ends at the end of a-slot 602I. The boundaries of the ED p-slot 606 may be defined based on the last frame synchronization information that the ED 110 obtained while the ED 110 was in the RRC_CONNECTED state 410.

According to aspects of the present application, the reception point 512 can obtain timing and positioning information for the ED 110 based on receiving (step 534) the backscatter signal 600BS in the context of a record of the specific forward signal 600FS.

Notably, in FIG. 6, the backscatter signal 600BS does not include all of the a-slots 602 that are in the forward signal 600FS. In aspects of the present application, the ED 110 does not transmit (step 530) the backscatter signal 600BS continuously. Instead, the ED 110 transmits (step 530) the backscatter signal 600BS following a sometimes-on and sometimes-off pattern. The ED p-slot 606 of the backscatter signal 600BS corresponds to the passive device components 212 of the ED 110 initially being controlled by the processing unit 200 to be OFF, then being controlled by the processing unit 200 to be ON and transmitting a-slots 602C through 602I and then being controlled by the processing unit 200 to turn OFF.

Figure 7:
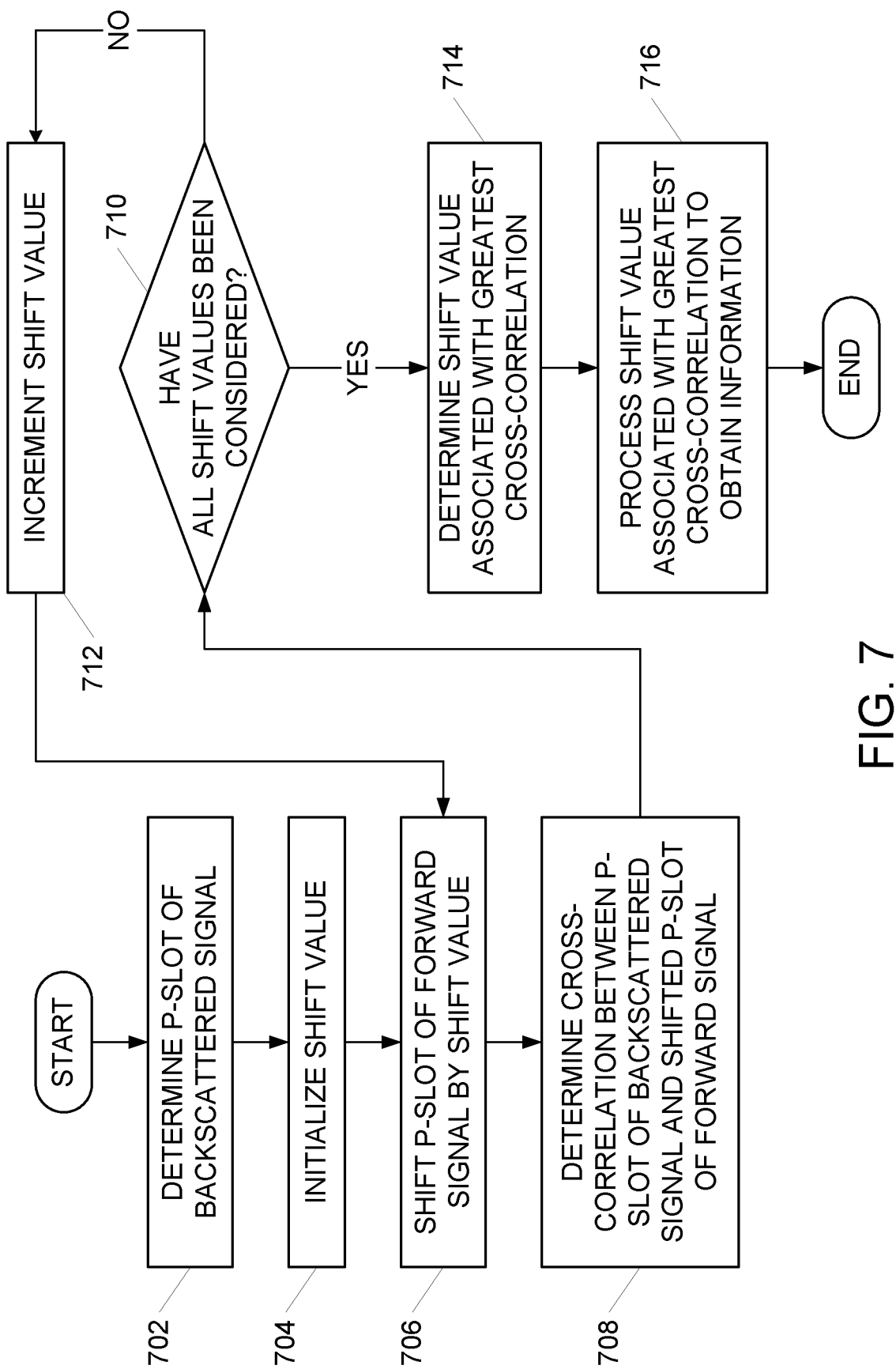
FIG. 7 illustrates example steps in a method of processing, at the reception point of FIG. 5A, the received backscatter signal, according to aspects of the present disclosure.

FIG. 7 illustrates example steps in a method of processing (step 538R, FIG. 5A) the received backscatter signal at the reception point 512. The method of FIG. 7 commences with the reception point 512 determining (step 702) the ED p-slot 606 of the backscatter signal 600BS. That is, the reception point 512 determines (step 702) the boundaries of the ED p-slot 606. Determining (step 702) the boundaries of the ED p-slot 606 can be performed by examining the transition time between ON and OFF patterns. In some embodiments, it is also possible to determine (step 702) the boundaries of the ED p-slot 606 by examining the phase transition time between the normalized received backscatter signal over all a-symbols defined as $$S_{norm}(t) = \frac{S_{BS}(t)}{S_{FS}(t)}$$

where $S_{BS}(t)$ denotes the backscatter signal 600BS and $S_{FS}(t)$ denotes the forward signal 600FS. Without regard for the manner of determining the boundaries, a term, $t_p$, may be used to denote a time difference between the start of the ED p-slot 606 and the start of the TP p-slot 604. The reception point 512 may then initialize (step 704) a time shift value. The value of the time shift value is determined by the required time granularity for the timing acquisition and/or positioning of the ED 110 and also the bandwidth of the forward signal 600FS. FIG. 6 illustrates an initial transmission point (TP) p-slot 604 that starts at the beginning of a-slot 602A and ends at the end of a-slot 602G. The reception point 512 may then time shift (step 706) the initial TP p-slot 604 of the forward signal 600FS by the time shift value to result in a time-shifted TP p-slot (not shown). If the initialized time shift value is zero, then the time-shifted p-slot begins at a-slot 602A. The reception point 512 may then determine (step 708) a value for a cross-correlation between the time-shifted TP p-slot and the ED p-slot 606 determined in step 702.

The determining (step 708) is to be carried out for an intended range of time shift values. Accordingly, the reception point 512 determines (step 710) whether the intended range of time shift values have been considered. Upon determining (step 710) that the entirety of the intended range of time shift values have not yet been considered, the reception point 512 increments (step 712) the time shift value and returns to time shift (step 706) the initial TP p-slot 604 of the forward signal 600FS by the incremented time shift value to result in a further time-shifted TP p-slot (not shown). If the time shift value equals the duration of each a-symbol and incremented time shift value is one, then the further time-shifted p-slot begins at a-slot 602B. In general, the value of the time shift value is less than or equal to the duration of an a-symbol.

The reception point 512 may then determine (step 708) a value for a cross-correlation between the further time-shifted TP p-slot and the ED p-slot 706 determined in step 702. Upon determining (step 710) that the entirety of the intended range of time shift values have not yet been considered, the reception point 512 increments (step 712) the time shift value and returns to time shift (step 706) the initial TP p-slot 604 of the forward signal 600FS by the incremented time shift value to result in an even further time-shifted TP p-slot (not shown). If the incremented time shift value is two, then the even further time-shifted p-slot begins at a-slot 602C.

Upon determining (step 710) that the entirety of the intended range of time shift values have been considered, the reception point 512 determines (step 714) the time shift value, τ, associated with the greatest cross-correlation value. The reception point 512 may then process (step 716) the time shift value, τ, associated with the greatest cross-correlation value to obtain information about the ED 110, including the position of the ED 110 and the timing of ED 110.

Figure 8:
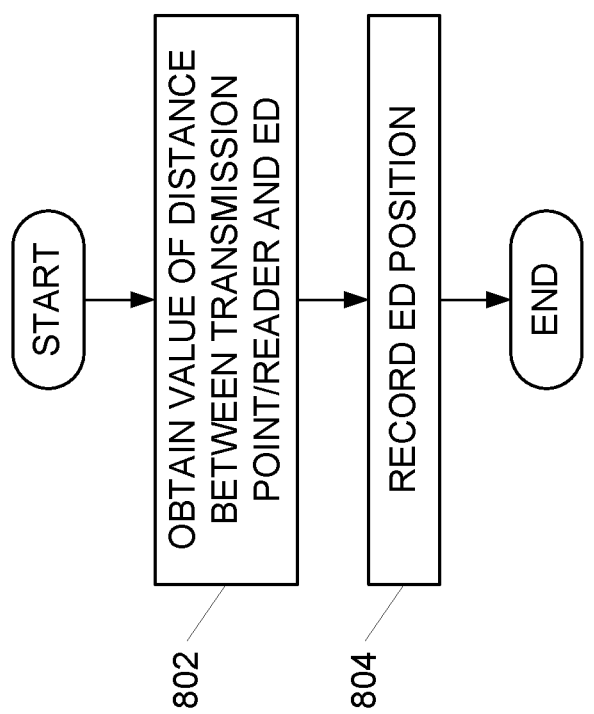
FIG. 8 illustrates example steps in a method of processing, at the reception point of FIG. 5A, a time shift value associated with a greatest cross-correlation value to obtain information about the electronic device of FIG. 5A, according to aspects of the present disclosure.

FIG. 8 illustrates example steps in a method of processing (step 716, FIG. 7), at the reception point 512, the time shift value, τ, associated with the greatest cross-correlation value to obtain information about the ED 110. In the example of FIG. 8, the time shift value, τ, associated with the greatest cross-correlation value may be used to obtain (step 802) a value for a distance between the transmission point 502/reception point 512 and the ED 110 (assuming that the transmission point 502 and the reception point 512 are located in the same place). The distance, d, may be obtained (step 802) through use of the equation $$d = \frac{\tau c}{2}$$

where τ is the time shift value determined in step 714 and c is the speed of light. Upon obtaining (step 802) the value for the distance, the reception point 512 may record (step 804) the distance as an indication of the position for the ED 110. The recording (step 804) of the indication of the position for the ED 110 may, for example, involve storing the indication of the position in a memory. If the reception point 512 is the base station 170 illustrated in FIG. 3, the indication of the position for the ED 110 may be stored in the memory 358.

Figure 9:
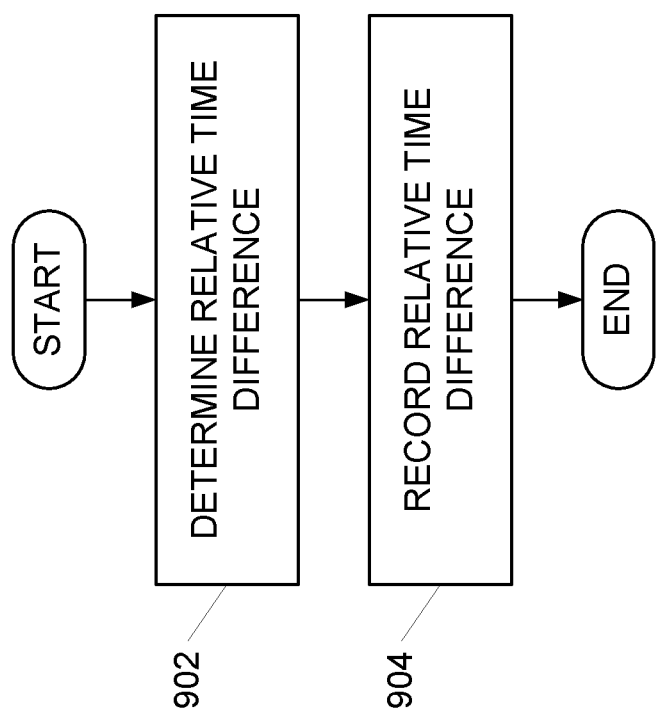
FIG. 9 illustrates example steps in a method of processing, at the reception point of FIG. 5A, a time shift value associated with a greatest cross-correlation value to obtain information about the electronic device of FIG. 5A, according to aspects of the present disclosure.

FIG. 9 illustrates example steps in a method of processing (step 716, FIG. 7) the time shift value, τ, associated with the greatest cross-correlation value to obtain information about the ED 110. In the example of FIG. 9, the reception point 512 determines (step 902) a relative time difference term, $t_0$. Determining (step 902) the relative time difference term, $t_0$, may involve the time shift value, τ (see step 714), associated with the greatest cross-correlation value and the time difference, $t_p$ (see step 702), between the start of the ED p-slot 606 and the start of the TP p-slot 604 in $$t_0 = t_p - \frac{\tau}{2}.$$

upon determining (step 902) the relative time difference, the reception point 512 may then record (step 904) the relative time difference as an indication of the timing for the ED 110. The recording (step 904) of the indication of the timing for the ED 110 may, for example, involve storing the indication of the timing in a memory. If the reception point 512 is the base station 170 illustrated in FIG. 3, the indication of the timing for the ED 110 may be stored in the memory 358.

In an environment, such as the communication system 100 of FIG. 1, wherein a plurality of EDs 110 are present, it is preferred that the reception point 512 be provided with a manner of distinguishing between backscatter signals received from distinct EDs 110.

To such an end, in an aspect of the present application, each particular ED 110 may arrange respective ED-unique on/off patterns of backscatter transmissions to, thereby, indicate, to the reception point 512, an identity for the particular ED 110. A transmission frame may be defined as including K p-slots. Each particular ED 110 may arrange to transmit (step 530, FIG. 5A) a backscatter transmission during only a subset of L p-slots in the transmission frame.

Figure 10:
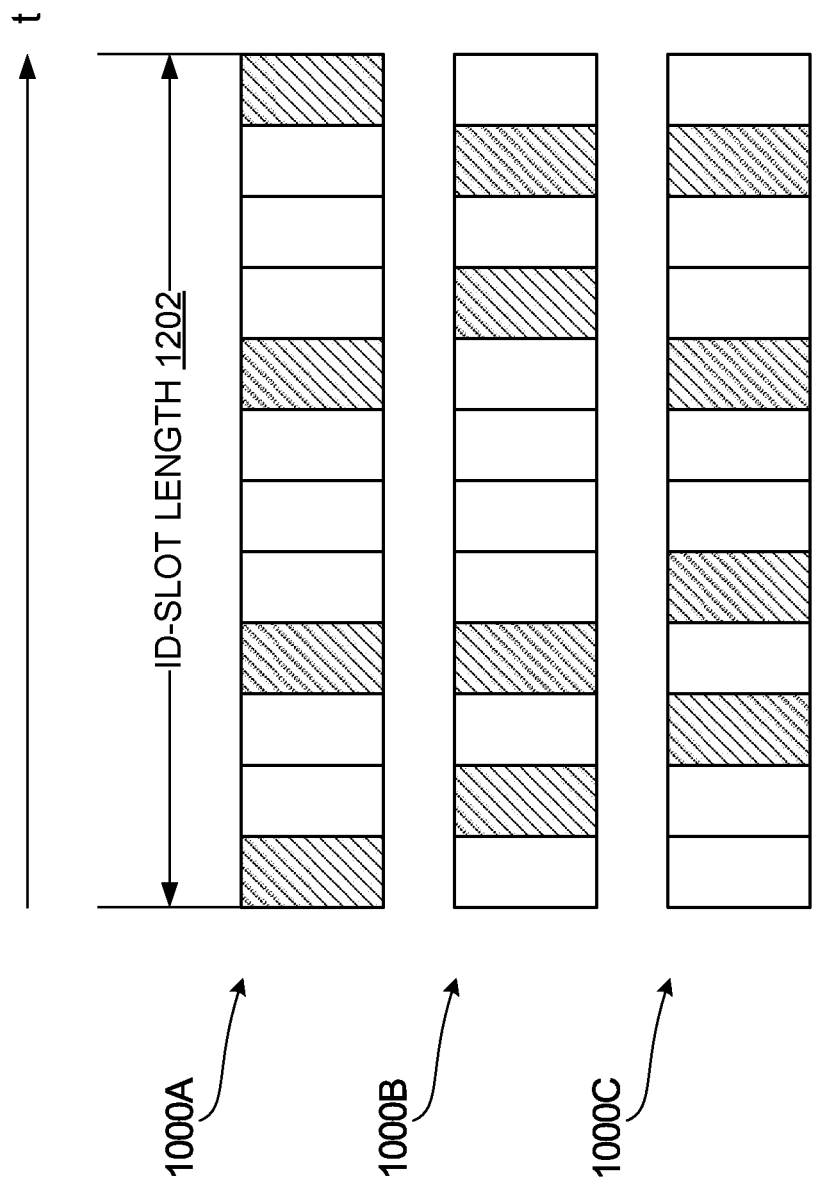
FIG. 10 illustrates a plurality of identity slots corresponding to the plurality of electronic devices of FIG. 1, according to aspects of the present disclosure.

FIG. 10 illustrates a first transmission frame 1000A corresponding to the first ED 110A of FIG. 1, a second transmission frame 1000B corresponding to the second ED 110B of FIG. 1 and a third transmission frame 1000C corresponding to the third ED 110C of FIG. 1. Each of the example transmission frames 1000A, 100B, 1000C (collectively or individually 100) has a transmission frame length 1202 of K=12 p-slots and each of the example transmission frames 1200 indicates that backscatter transmission occurs in L=4 of the p-slots. The first transmission frame 1000A indicates that the first ED 110A performs backscatter transmission (is ON) in p-slots 1, 4, 8 and 12 and is OFF in p-slots 2, 3, 5, 6, 7, 9, 10 and 11. The second transmission frame 1000B indicates that the second ED 110B performs backscatter transmission (is ON) in p-slots 2, 4, 9 and 11 and is OFF in p-slots 1, 3, 5, 6, 7, 8, 10 and 12. The third transmission frame 1000C indicates that the third ED 110C performs backscatter transmission (is ON) in p-slots 3, 5, 8 and 11 and is OFF in p-slots 1, 2, 4, 6, 7, 9, 10 and 12.

Each particular ON/OFF pattern can be associated with an identity of the ED 110 that is configured to perform backscatter transmission according to the particular ON/OFF pattern. Such an association may be seen to facilitate identification of the ED 110 by the reception point 512. The association can be stored as a pre-defined dictionary or a look up table (LUT). The dictionary or LUT may only be known among the elements of the communication system 100 of FIG. 1.

In order to minimize the number of hypothesis for ON/OFF patterns, each ON/OFF pattern may be recorded with an association to a location for the corresponding ED 110.

In other aspects of the present application, an ON/OFF pattern can act as preamble transmission, thereby facilitating tracking and discovery of the corresponding ED 110. Detection of the identity of ED 110 based on the ON/OFF pattern may be considered to enable joint ED identification and detection of ED data provided by the ED 110, which will be disclosed more fully hereinafter.

Configuring an ON/OFF pattern that is specific to an ED 110 may be seen to improve ED detection performance and complexity by allowing partial collision between p-slots arriving at a reception point 512 from distinct EDs 110. For example, in the fourth p-slot, both the first ED 110A and the second ED 110B are performing backscatter transmission and the third ED 110C is not performing backscatter transmission.

As disclosed up to this point, and illustrated in FIG. 5A, the ED 110 may transmit (ON, step 530) a backscatter signal in a p-slot or not transmit (OFF) a backscatter signal in a p-slot. Conveniently, upon processing (step 538R, FIG. 5A) the backscatter signal received in each transmission frame, the reception point 512 may obtain information about the ED 110, such as timing, position and identity.

It is proposed herein to assist the reception point 512 to distinguish between successive p-slots in which backscatter signals are transmitted by the ED 110. That is, rather than simply performing backscatter transmission (ON) or not performing backscatter transmission (OFF), the ED 110 may subject the forward signal to a time-domain function when forming a backscatter signal.

At the ED 110, subjecting the forward signal to a time-domain function may involve use of passive components of the ED 110. For one example, the processing unit 200 may arrange a change in an impedance value in the RF circuit 210 connected to the antenna 204 (see FIG. 2). The result of subjecting the forward signal to a time-domain function may be mathematically presented as multiplying the received forward signal by a complex-valued symbol.

In the p-slot associated with an index, k, the $i^{th}$ ED 110 may multiply the received forward signal 600FS in p-slot k by a complex-valued symbol, $s_i(k)$. Notably, the symbol, $s_i(k)$, in p-slot k may be different from the symbol, $s_i(k+1)$, in p-slot k+1. Furthermore, it may not be assumed that value of the symbol, $s_i(k)$, is known by the reception point 512. It has been discussed that the ED 110 may subject the forward signal to a time-domain function. Notably, the time-domain function may be defined over a transmission frame and may be considered to include a plurality of symbols, $s_i(k)$. In the simple cases, the symbols, $s_i(k)$, can take on a value of either 0 or 1. In other cases, each symbol, $s_i(k)$, is complex-valued.

Upon receiving (step 526, FIG. 5A) the forward signal 600FS comprising a plurality of sub-signals (e.g., a-symbols), the ED 110 may form (step 528) the backscatter signal 600BS by multiplying the received forward signal 600FS by the symbol, $s_i(k)$. The ED 110 subsequently transmits (step 530) the radio frequency backscatter signal 600BS over a defined duration (e.g., a p-slot).

It may be considered that the transmission (step 530) of the backscatter signal 600BS that has been formed (step 528) by multiplying the received forward signal 600FS by the symbol, $s_i(k)$, is one example of obtaining a time-domain function of a sub-signal among the plurality of sub-signals (a-slots) included in the received forward signal 600FS. In those cases wherein the ED 110 is consistently transmitting backscatter signals, the distinctness of each symbol, $s_i(k)$, may allow the reception point 512 to distinguish between successive p-slots in the received backscatter signal.

The information that the reception point 512 may obtain about the ED 110 is augmented through the addition of ED data to the backscatter signal transmitted in the p-slots. That is, rather than simply performing backscatter transmission (ON) or not performing backscatter transmission (OFF), the ED 110 may subject the forward signal to a time-domain function when forming a backscatter signal.

In addition to merely allowing the reception point 512 to distinguish between successive p-slots in the received backscatter signal, the transmission of a time-domain function of a sub-signal among the plurality of sub-signals included in the received forward signal 600FS may allow the ED 110 to transmit, to the reception point 512, data, hereinafter called "ED data."

The baseband equivalent of each symbol, $s_i(k)$, transmitted by a particular ED 110 may be constrained to be in a "projection set" of symbols $\{a_1, \ldots, a_p\}$ (with some possible phase rotations) where P denotes a number of distinct symbols (projections) that are available as a result of appropriate impedance changes that the processing unit 200 may arrange in the passive device components 212 of the RF circuit 210 (see FIG. 2). The projection set can be different from ED 110 to ED 110. When the symbol, $s_i(k)$, is used to communicate ED data, the ED may be configured to transmit m bits $b_i=(b_0, b_1, \ldots, b_{m-1})$ over each p-slot. This corresponds to a modulation size of $M=2^m$.

It may be considered that designing a codebook for the backscatter signal is an exercise similar to the known exercise of designing a codebook for a Sparse Code Multiple Access (SCMA) communications system. SCMA is a known, multi-dimensional, codebook-based, non-orthogonal multiple access technique.

The backscatter signal codebook can be made specific to a particular ED 110 by employing a sparsity pattern that is specific to the particular ED 110 and/or employing a projection set of symbols $\{a_1, \ldots, a_p\}$ that is specific to the particular ED 110. A specific projection set can be realized by including, in the RF circuit 210 (FIG. 2), a radio frequency phase shifter (not shown) that is specific to the particular ED 110. A specific projection set can also be realized by implementing a perturbation function that is specific to the particular ED 110.

A first example projection set may be called a "binary projection set." In a binary projection set, the symbols can take on values $\{a_1, a_2\}=\{1, -1\}$.

One manner of designing multi-dimensional codebook involves use of a binary generation matrix (which should be familiar from use in binary block codes), i.e., $\vec{s}_i=(1-G_i\odot b_i)$, where $\odot$ denotes a multiplication in the binary domain and $G_i$ is called a generator matrix and $\vec{s}_i$ is the vector of symbols to be transmitted by the ED 110 in the backscatter signal during the transmission frame. The generator matrix, $G_i$, can be specific to the ED 110 that implements the codebook. As will be understood, any binary code with good Hamming distance between the codewords can be used. Indeed, the Hamming distance in the binary domain may be seen to directly translate to a Euclidean distance in the symbol domain.

A second example projection set may be called a "tertiary projection set." In a tertiary projection set, the symbols can take on values $\{a_1, a_2, a_3\}=\{1, 0, -1\}$.

One manner of designing multi-dimensional codebook involves use of a binary generation matrix. A 2-bit transmission, the case where m=2, can be realized by superposition of two binary codewords with orthogonal sequences $$\vec{s}_i = f_{i,1}(1-2b_0)+f_{i,2}(1-2b_1), \text{ where } f_{i,1}^H f_{i,2}=0.$$

An example with L=2 may be represented as:

$$\vec{S}_i = \begin{bmatrix} 1 \\ 1 \end{bmatrix}(1-2b_0) + \begin{bmatrix} 1 \\ -1 \end{bmatrix}(1-2b_1).$$

The sequences $f_{i,1}$ and $f_{i,2}$ may be made specific to the ED 110 at which the sequences are employed. In some embodiments, on/off pattern generation is incorporated into the symbol sequence design by including "0" in the projection set of symbols $\{a_1, \ldots, a_p\}$. In this case, the symbol sequence length represents the total number of p-slots instead of only the ON p-slots.

An example codebook, with K=4, may be represented as:

$$\vec{S}_i = \begin{bmatrix} 1 \\ 1 \\ 1 \\ 1 \end{bmatrix}(1-2b_0) + \begin{bmatrix} 1 \\ -1 \\ 1 \\ -1 \end{bmatrix}(1-2b_1).$$

In this case, the on/off pattern depends not only on the identity of the ED 110, but also on the input bit sequence.

Figure 11:
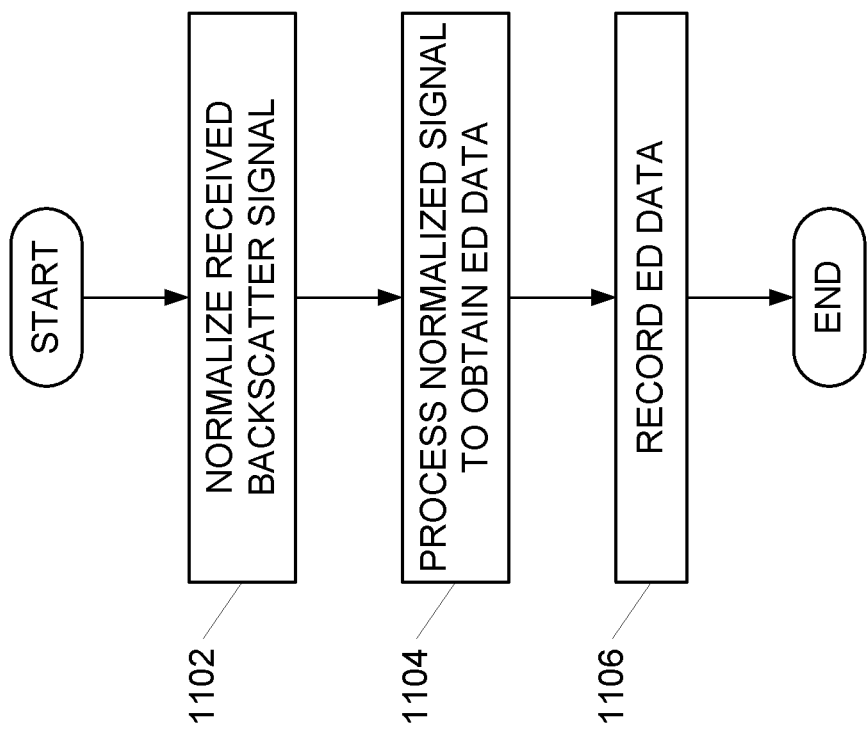
FIG. 11 illustrates example steps in a method of processing a backscatter signal that includes data.

FIG. 11 illustrates a method, for carrying out at the reception point 512, of processing (step 538R, FIG. 5A) the backscatter signal 600BS that includes ED data. While FIG. 7 illustrates processing the backscatter signal 600BS to obtain information, such as position (FIG. 8) and relative time difference (FIG. 9), from p-slot borders, FIG. 11 is specific to obtaining data that the ED 110 has included in the backscatter signal 600BS using methods discussed hereinbefore.

The reception point 512 normalizes (step 1102) the received backscatter signal by dividing the received backscatter signal by the forward signal, thereby obtaining a normalized backscatter signal. The normalized backscatter signal may be considered to be representative of $s_i(k)$, k=1, . . . , K. The reception point 512 may then process (step 1104) the normalized backscatter signal to obtain the ED data represented by the symbol sequence $s_i(k)$, k=1, . . . , K. The reception point 512 may then record (step 1106) the ED data.

It has been disclosed hereinbefore that the symbol, $s_i(k)$, may be different from p-slot k to p-slot k+1. It has been discussed herein that the symbol, $s_i(k)$, may carry ED data. In an aspect of the present application, the symbol, $s_i(k)$, may be identical in each of the L p-slots among the K p-slots. This repetition of data may be understood to provide what is known as "coding gain."

The forward signal may be designed to facilitate aggregate channel state information (CSI) estimation by the reception point 512. The term "aggregate channel" may be understood to include the forward channel from the transmission point 502 to the ED 110 and the back channel from the ED 110 to the reception point 512. Improvements in CSI estimation by the reception point 512 may be considered to be useful for allowing the reception point 512 to better decode the ED data over the p-slots.

The transmission (step 522, FIG. 5A) of the radio frequency forward signal 600FS may be optimized for CSI acquisition. For CSI acquisition, frequency granularity may be considered more important than time granularity, since the aggregate channel may be considered to be more static over time than over frequency.

It follows that a multi-carrier design for the forward signal 600FS is preferable.

In addition to the resource allocation aspects of the forward signal design, consideration may also be applied to a sequence design for the forward signal 600FS. The sequence in a forward signal may include one or more of a positioning reference signal (PRS), a demodulated reference signal (DMRS), another reference signal and data.

Figure 12:
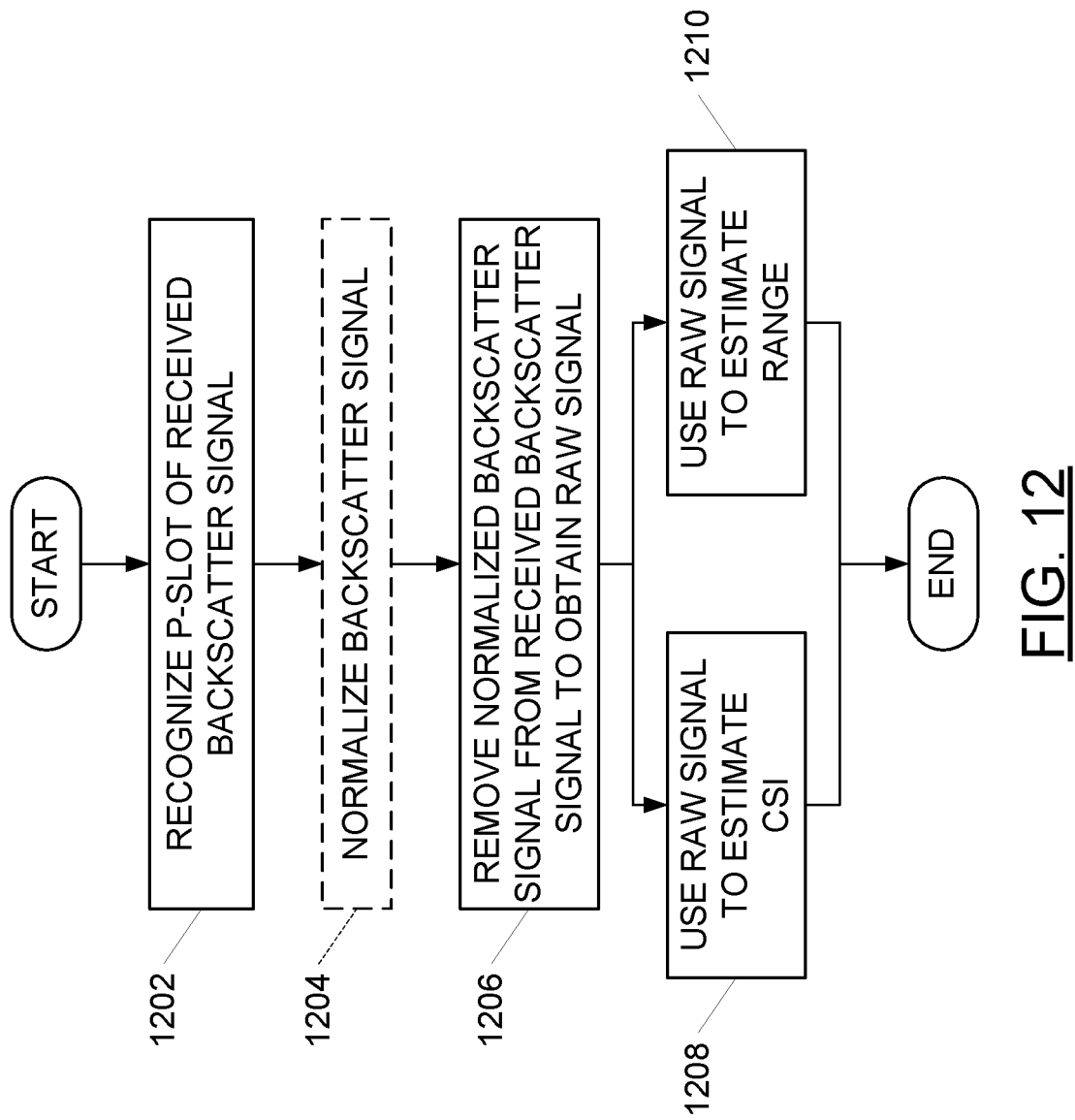
FIG. 12 illustrates example steps in a method of processing the received backscatter signal for channel state information acquisition, according to aspects of the present disclosure.

FIG. 12 illustrates example steps in a method of processing (step 538R, FIG. 5A), at the reception point 512, the received backscatter signal 600BS for CSI acquisition. The method of FIG. 12 commences with the reception point 512 recognizing (step 1202) the ED p-slot of the backscatter signal 600BS. That is, the reception point 512 determines the boundaries of the ED p-slot. The reception point 512 may then normalize (step 1204) the received backscatter signal 600BS by dividing the received backscatter signal 600BS by the forward signal 600FS to, thereby, obtain a normalized backscatter signal. The normalized backscatter signal may be considered to be representative of the product of the aggregate channel (H) and $s_i(k)$. Therefore, if $s_i(k)$ is known or somehow can be obtained from the backscatter signal 600BS, the normalized backscatter signal can be further divided by $s_i(k)$, k=1, . . . , K, over each corresponding p-slot from which the aggregate channel can be estimated (step 1206).

In some embodiments, when the knowledge of $s_i(k)$, k=1, . . . , K, is not available at the reception point 512, the ED 110 can be instructed to transmit some "reference p-slots" over which $s_i(k)$ is known. In some embodiments, the ED 110 does not multiply the forward signal 600FS in the reference p-slots and, hence, $s_i(k)$=1 in those p-slots. This facilitates the estimation of aggregate channel over the reference p-slots and, if the channel does not change much over different p-slots, this helps determining $s_i(k)$ over other p-slots, which gives more accurate estimation of the aggregate channel. In some embodiments, the process of estimating the aggregate channel and $s_i(k)$, k=1, . . . , K, can be done in an iterative fashion.

In some embodiments, the step of normalizing (step 1204) the backscatter signal may not be performed. In this case, the reception point 512 performs removing the symbols $s_i(k)$, k=1, . . . , K from the backscatter signal based on the methods described above. After the symbols $s_i(k)$, k=1, . . . , K have been removed (step 1206) from the received backscatter signal, the result may be called a "raw" signal. It may be shown that the raw signal can act as a reference signal for CSI estimation (step 1208). It may also be shown that the raw signal can act as a radar signal for range estimation (step 1210). Notably, the CSI estimation (step 1208) and the range estimation (step 1210) may be carried out simultaneously.

Since the CSI estimation (step 1208) does not change over from one p-slot during which the ED 110 transmits the backscatter signal to another p-slot during which the ED 110 transmits the backscatter signal, the CSI estimation (step 1208) can be further improved by averaging over all L p-slots (among the total of K p-slots) during which the ED 110 transmits the backscatter signal.

Notably, when, according to aspects of the present application, the ED 110 transmits the backscatter signal that includes ED data, the ED 110 merely performs the transmitting responsive to receiving the forward signal. It follows that a malicious combination of the transmission point 502 and the reception point 512 could gain access to the ED data by sending a forward signal and reading the backscatter signal.

Accordingly, further aspects of the present application relate to configuration of the elements of the environment so that only the appropriate reception point 512 may have access to the ED data. It is proposed herein to arrange that the ED 110 perturbs the backscatter signal with a perturbation pattern for each transmission p-slot. The perturbation pattern may, in one example, be built-in to each ED 110. The ED 110 may provide the perturbation pattern to the reception point 512 once, e.g., through a secure link. When deemed necessary, the transmission point 502 may reconfigure the ED 110 with a new perturbation pattern. In some embodiments, the perturbation pattern may be determined and configured by the network and provided to the ED 110 when the ED 110 accesses the network through a secure link. The transmission point 502 would also update the reception point 512 with the new perturbation pattern.

The perturbation may be represented as $s_i(k)=f_{i,k}(u_i(k))$, where $u_i(k)$ denotes an ED-data-carrying symbol to be transmitted by the $i^{th}$ ED 110 over the $k^{th}$ p-slot, $f_{i,k}(\bullet)$ denotes the perturbation function, which depends on the identity of the $i^{th}$ ED 110 and the index, k, of the p-slot, and $s_i(k)$ is the resultant transmitted symbol. That is, $s_i(k)$ is the symbol used by the ED 110 to alter the forward signal to form (step 528, FIG. 5A) the backscatter signal 600BS.

One example of a perturbation function is a phase shift, which may be represented as $s_i(k)=u_i(k)e^{j\Phi_{i,k}}$. This perturbation function can be embedded into a definition of a constellation or codebook that is specific to the ED 110 and can be realized by impedance matching.

As a consequence of the use of the perturbation function, a malicious version of the reception point 512, without access to the codebook, would be unlikely to be able to quickly decode the received $s_f(k)$ to determine $u_f(k)$. It is understood that, theoretically, the malicious version of the reception point 512 may eventually decode the backscatter signal in a particular p-slot by testing multiple hypothesis phase shifts. It is further proposed that the feasibility of such a decoding approach may be rendered relatively low by causing the malicious version of the reception point 512 to have to test a very large number of hypothesis phase shifts.

In addition to the resource allocation aspects of the forward signal design, consideration may also be applied to a sequence design for the forward signal. The sequence in a forward signal may include one or more of a Positioning Reference Signal (PRS), a Demodulation Reference Signal (DMRS), another reference signal and data.

In a case wherein the transmission point 502, at the origin of the forward signal, and the reception point 512, the receiver of the backscatter signal, are part of the same node, the forward signal may be designed to contain data for specific EDs 110. The data in the forward signal may be intended for all of the EDs 110, in which case the data may be considered to be broadcast. The data in the forward signal may be intended for a specific subset of the EDs 110, in which case the data may be considered to be groupcast. The data in the forward signal may be intended for a specific one of the EDs 110, in which case the data may be considered to be unicast.

That is, just as the ED 110 may form (step 528, FIG. 5) a backscatter signal 600BS modulated with ED data for consumption by the reception point 512, the transmission point 502 may form the forward signal modulated with data designated for consumption by specific EDs 110 before transmitting (step 522, FIG. 5A) the forward signal 600FS. As will be understood, the specific EDs 110 designated for reception of the data from the transmission point 502 may be distinct from the EDs 110 that are configured for performing backscatter communications.

Throughout this application, various configuration parameters for the manner in which the ED 110 acts to backscatter, or acts to not backscatter, a forward signal have been discussed. For a given ED 110, the configuration parameters may include a p-slot duration, an ON/OFF pattern, a backscatter codebook and a perturbation function, among other configuration parameters. Additionally, the configuration parameters may include the forward signal parameters including bandwidth, waveform, numerology, and a-slot duration. In some embodiments, a-slot duration can be obtained from numerology. In some embodiments, the configuration parameters may include the relation of p-slot and a-slot, for example how many a-slots are in each p-slot. In some embodiments, the configuration parameters may also include the index of the "reference p-slots" used for channel estimation at the reception point 512. The configuration parameters that define the backscattering by the ED 110 may be provided to the ED 110 by an entity in the environment 100 of FIG. 1 in the form of signaling. The signaling method may include dynamic signaling, such as layer one (L1) signaling, or semi-static signaling, for example, using a layer higher than L1, such as RRC or media access control (MAC) control element (MAC-CE). The configuration parameters of the backscattering may also be provided to the reception point 512 by an entity in the environment 100 of FIG. 1. If the reception point 512 is a network entity, the signaling method may include X2 or Xn signaling. If the reception point 512 is another ED 110, the signaling method may include dynamic signaling, such as L1 signaling, or semi-static signaling, for example, using a higher layer, such as RRC or MAC-CE. Alternatively, in view of the ED 110 being configured to have an identity, selected configuration parameters may be determined by the ED 110 though use of a function. For example, by subjecting the identity of the ED 110 to a specific function, the ED 110 may determine an ON/OFF pattern. In this case, the parameters of the specific function may be provided to the ED 110 through signaling in the form of dynamic signaling, such as L1 signaling, or semi-static signaling, for example, using a higher layer, such as RRC or MAC-CE.

Aspects of the present application may be seen to have advantages in the area of sensor nodes operating according to 5G networking protocols. Such sensor nodes (sometimes "tags") may be considered to include very low-cost devices that have limited battery power. Despite limited battery power, the sensor nodes are regularly called upon to actively communicate with a central network component to report a result of some sensing. Sensor nodes operating in accordance with aspects of the present application may be seen to only transmit information to a reception point 512 by backscattering a signal received from a transmitter. Conveniently, the sensor nodes need not necessarily perform baseband processing or analog to digital conversion.

Figure 13:
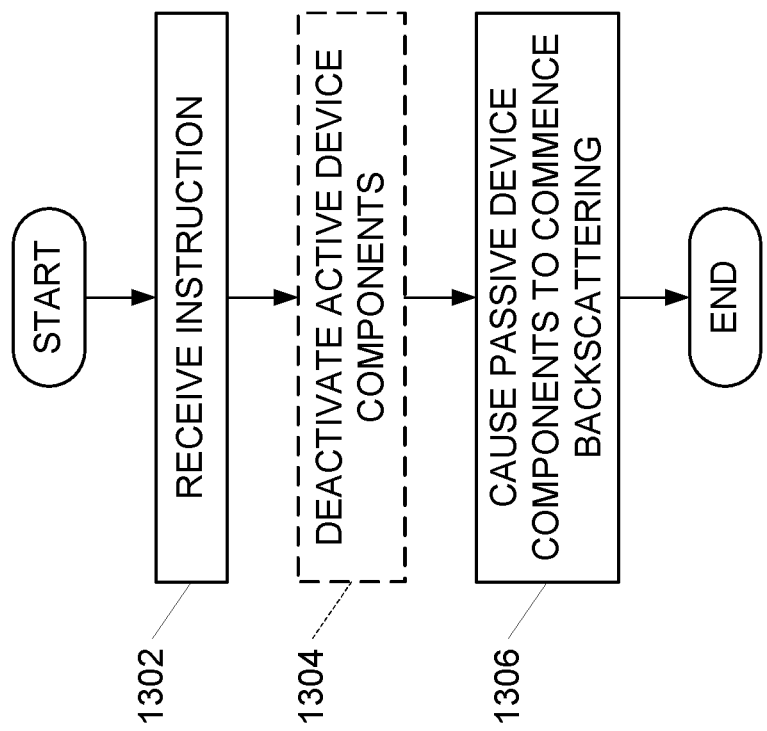
FIG. 13 illustrates example steps in a method, carried out at the electronic device of FIG. 2, to switch between the active device components and the passive device components according to aspects of the present disclosure.

FIG. 13 illustrates example steps in a method, carried out by the processor 200 of the electronic device 110, to switch between the active device components 211 and the passive device components 212. The context for the method of FIG. 13 may be considered to begin with the electronic device 110 operating in the normal power consumption operation mode 402 (see FIGS. 4A, 4B and 4C). Upon determining that, responsive to an instruction received (step 1302) from the base station 170, the electronic device 110 is to transition itself into the low power consumption operation mode 404.

Responsive to detecting (step 1302) the initiation, the processor 200 optionally deactivates (step 1204) the active device components 211 and causes (step 1306) the passive device components 212 to commence backscattering, where the backscattering assists in the performance of the certain functions previously performed by the active device components 211. The certain functions, as discussed hereinbefore, may relate to facilitating of tracking the electronic device 110, facilitating timing maintenance, facilitating identification of the electronic device 110, facilitating preamble transmission, facilitating determination of a position for the electronic device 110 and facilitating channel measurements.

In some aspects of the present application, the electronic device 110 implicitly receives (step 1302) an instruction to cause (step 1306) the passive device components 212 to commence backscattering when the electronic device 110 detects initiation of the release procedure 442 or the release with suspend procedure 446 (see FIGS. 4B and 4C). In some aspects of the present application, the electronic device 110 explicitly receives (step 1302) an instruction via signaling to cause (step 1306) the passive device components 212 to commence backscattering.

As noted hereinbefore and illustrated, in FIG. 13, through the use of dashed lines, the deactivation (step 1304) of the active device components 211 is optional. That is, it is possible to cause (step 1306) the passive device components 212 to be activated without turning off the active device components 211. It is also possible to cause (step 1306) the passive device components 212 to be activated without the electronic device 110 transitioning itself into the RRC_INACTIVE state 406. In the scheme illustrated in FIG. 4B, it may be considered that only the active device components 211 are active when the electronic device 110 is operating in the RRC_CONNECTED state 410 (in the normal power consumption operation mode 402) and only the passive device components 212 are active when the electronic device 110 is operating in the RRC_IDLE state 408 (in the low power consumption operation mode 404).

A signaling mechanism that allows a network entity to cause the ED 110 to enter into the low power consumption operation mode 404 may be periodic or aperiodic (on-demand based). For periodic transmission of the signaling, the network entity may be expected to provide, to the electronic device 110, an indication of a starting time for the signaling, a period (a duration for the time between transmissions) as well as a duration for the signaling. For aperiodic transmission of the signaling, may be expected to provide, to the electronic device 110, an indication of a starting time reference (e.g., a time slot in a transmission frame or an absolute timing point in a transmission frame) for the signaling and a duration for the signaling. It follows that the network entity may also use signaling to cause the electronic device 110 to enter into the normal power consumption operation mode 402.

Figure 14:
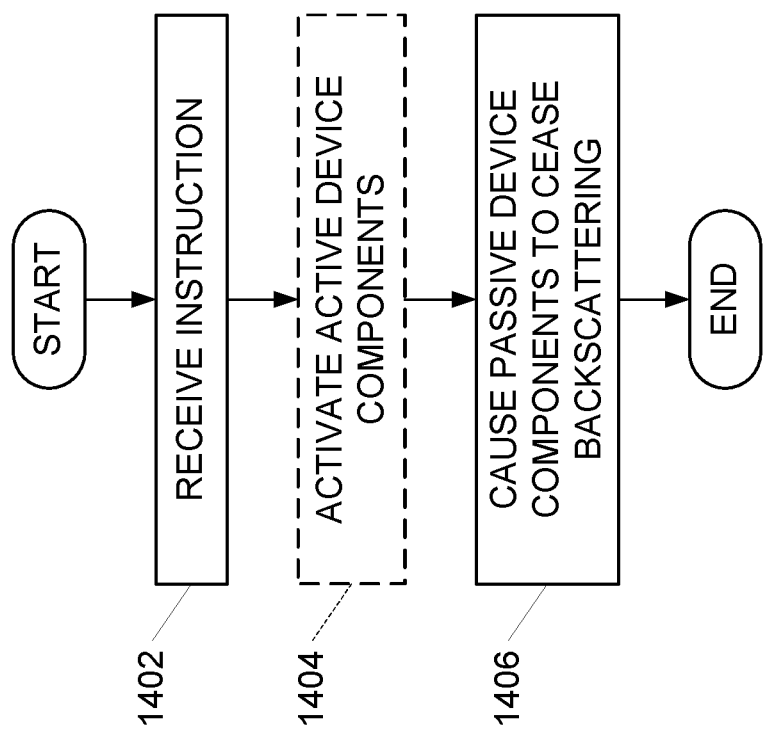
FIG. 14 illustrates example steps in a method, carried out at the electronic device of FIG. 2, to switch between the passive device components and the active device components according to aspects of the present disclosure.

FIG. 14 illustrates example steps in a method, carried out by the processor 200 of the electronic device 110, to switch between the passive device components 212 and the active device components 211. The context for the method of FIG. 14 may be considered to begin with the electronic device 110 operating in the low power consumption operation mode 404 (see FIG. 4A). Upon determining that, responsive to an instruction received (step 1402) from the base station 170, the electronic device 110 is to transition itself into the normal power consumption operation mode 402. That is, in the context of the scheme of FIG. 4B, the electronic device 110 detects (step 1402) initiation of the resume procedure 464 or the establish procedure 424. Responsive to detecting (step 1402) the initiation, the processor 200 optionally activates (step 1404) the active device components 211 and causes (step 1406) the passive device components 212 to cease backscattering.

It has been discussed that the receiving (step 1302, 1402) of an instruction from the base station 170 may involve detecting initiation of the release procedure 442, the release with suspend procedure 446, the resume procedure 464 or the establish procedure 424. It should also be clear that, outside of the various state-to-state transition procedures (424, 442, 446, 462,464) illustrated in FIG. 4B, an entity of the environment 100 (FIG. 1) that is not necessarily the base station 170, may use a signaling mechanism to directly instruct the ED 110 to switch between the normal power consumption operation mode 402 and the low power consumption operation mode 404, that is, to cause the passive device components 212 to commence (step 1306) or cease (step 1406) backscattering. The signaling method may include dynamic signaling, such as L1 signaling, or semi-static signaling, for example using a higher layer such as RRC or MAC-CE.

Indeed, such a signaling mechanism from a network entity in the environment 100 of FIG. 1 to the ED 110 may be one of many signaling mechanisms. As an example, the signaling method may include dynamic signaling, such as L1 signaling, or semi-static signaling, for example, using a higher layer such as RRC or MAC-CE.

A signaling mechanism that allows the network entity to control the ED 110 to cause the passive device components 212 to commence (step 1306) or cease (step 1406) backscattering may be periodic or aperiodic (on-demand based). For periodic transmission of the signaling, the network entity may be expected to provide, to the ED 110, an indication of a starting time for the signaling, a period (a duration for the time between transmissions) as well as a duration for the signaling. For aperiodic transmission of the signaling, may be expected to provide, to the ED 110, an indication of a starting time reference (e.g., a time slot in a transmission frame or an absolute timing point in a transmission frame) for the signaling and a duration for the signaling.

To this point, the ED 110 has been discussed as being one of three distinct states, based on RRC signaling: the RRC_CONNECTED state 410; the RRC_INACTIVE state 406; and the RRC_IDLE state 408 (see FIG. 46). In future, different states may be defined for the ED 110. It should be clear that, the passive device components 212 may operate in accordance with aspects of the present application in whatever state the ED 110 is operating.

Figure 15:
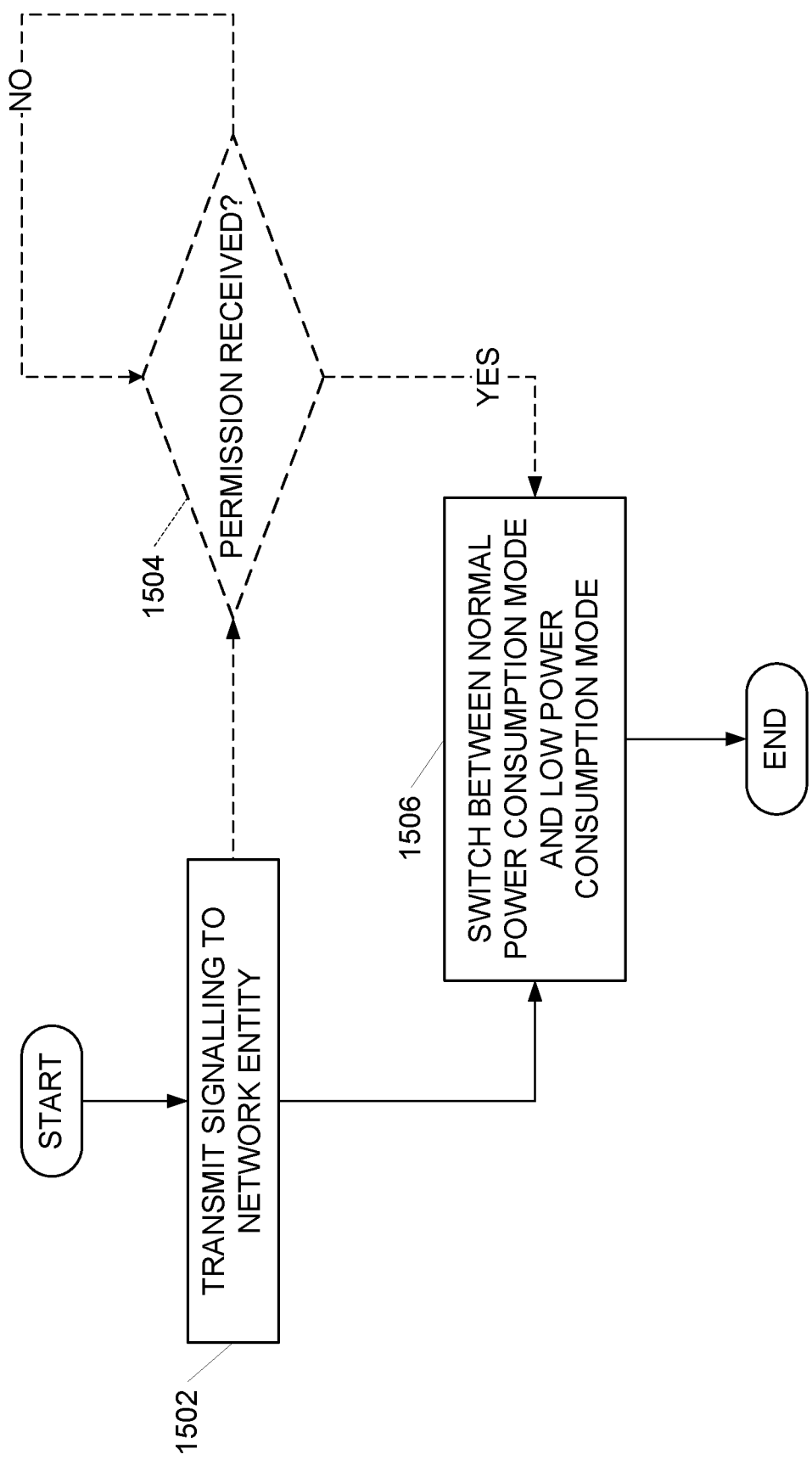
FIG. 15 illustrates example steps in a method of implementing a switch between operation modes, according to aspects of the present disclosure.

In other aspects of the present application, a switch between the normal power consumption mode 402 and the low power consumption mode 404 may be initiated by the electronic device 110. In accordance with aspects of the present application represented by example steps in a method illustrated in FIG. 15, the electronic device 110 may be configured to transmit (step 1502) signaling to a network entity to indicate that the electronic device 110 will imminently perform a switch between the normal power consumption mode 402 and the low power consumption mode 402. In one instance, the electronic device 110 does not wait for permission, from the network entity, before performing (step 1506) the mode switch. In another instance, the electronic device 110 waits to receive (step 1504) permission, from the network entity, before performing (step 1506) the mode switch.

Figure 16:
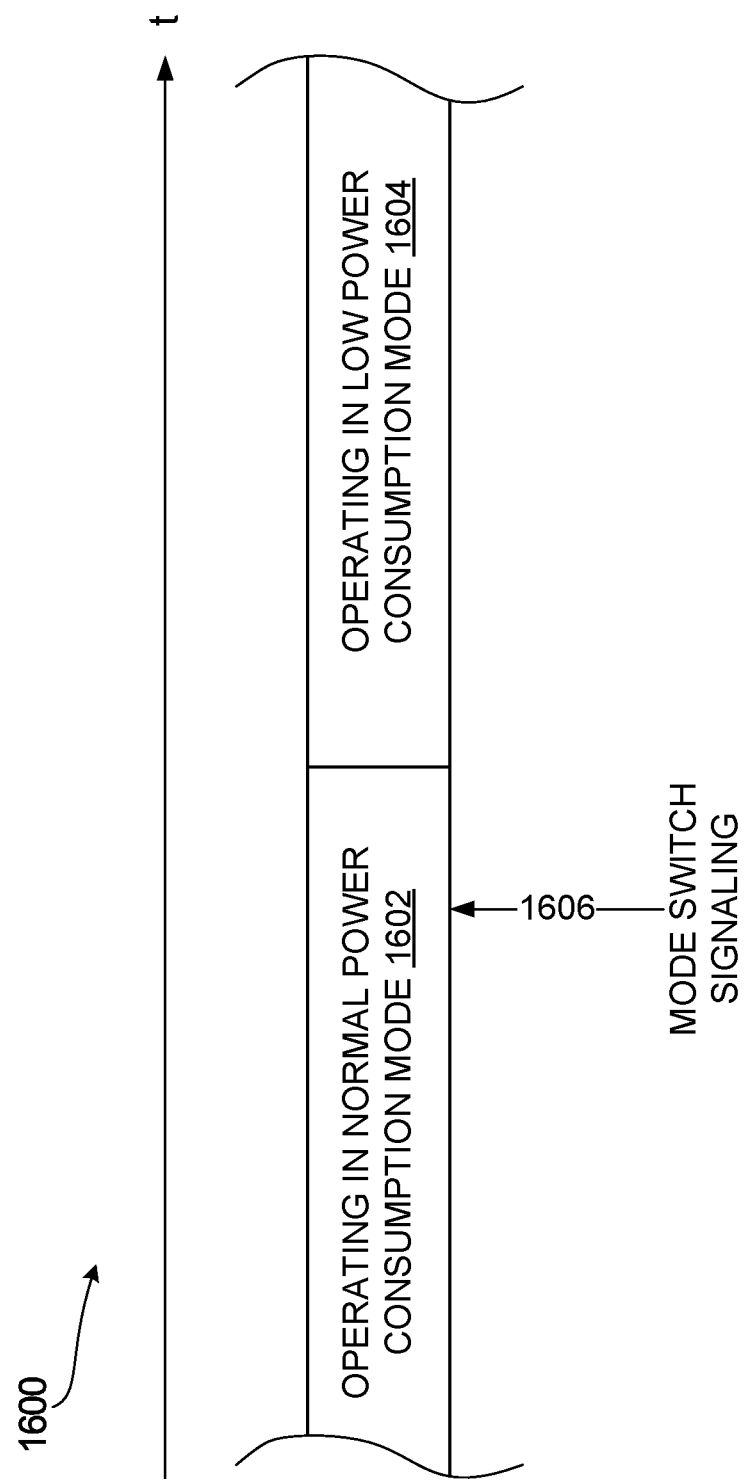
FIG. 16 a temporal view of operation of the electronic device of FIG. 2 according to aspects of the present disclosure.

FIG. 16 illustrates a temporal view 1600 of operation of the electronic device 110, including a time period 1602 during which the electronic device 110 is operating in the normal power consumption mode 402. The temporal view 1600 also includes a time period 1604 during which the electronic device 110 is operating in the low power consumption mode 404. The temporal view 1600 further includes an indication 1606 of a moment at which there is mode switch signaling. In one example, the indication 1606 relates to the electronic device 110 transmitting signaling to a network entity to indicate that the electronic device 110 will imminently perform a switch between the normal power consumption mode 402 and the low power consumption mode 404. In another example, the indication 1606 relates to the electronic device 110 receiving signaling, from a network entity, to instruct the electronic device 110 to perform a switch between the normal power consumption mode 402 and the low power consumption mode 404.

Notably, without regard to whether the mode switch signaling is received (steps 1302, 1402) or transmitted (step 1502), the mode switch signaling may contain additional information beyond an instruction (steps 1302, 1402) or an indication (step 1502). The additional information may relate to the functions (or, perhaps, a single function) that are to be performed, by the electronic device 110, when in the low power consumption mode 404.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method of operating an electronic device, the method comprising:
   receiving, by the electronic device, a first radio frequency (RF) signal, the first RF signal including a time-domain plurality of sub-signals, each sub-signal comprising an RF-upconverted baseband signal; and
   transmitting, by the electronic device, a second RF signal, the second RF signal being a time-domain function of a contiguous subset of the time-domain plurality of sub-signals in the first RF signal, wherein the time-domain function includes a modulation of the contiguous subset of the sub-signals in the first RF signal according to one or more complex-valued symbols.

2. The method of claim 1, wherein the time-domain function is specific to the electronic device.

3. The method of claim 1, further comprising receiving signaling indicating a configuration parameter defining the second RF signal.

4. The method of claim 1 further comprising, in response to receiving signaling indicating an operating mode associated with transmitting the second RF signal, generating the second RF signal from the first RF signal without decoding the plurality of sub-signals.

5. An electronic device comprising:
   a memory storing instructions; and
   a processor caused, by executing the instructions, to:
      receive a first radio frequency (RF) signal, the first RF signal including a time-domain plurality of sub-signals, each sub-signal comprising an RF-upconverted baseband signal; and
      transmit a second RF signal, the second RF signal being a time-domain function of a contiguous subset of the time-domain plurality of sub-signals in the first RF signal, wherein the time-domain function includes a modulation of the contiguous subset of the sub-signals in the first RF signal according to one or more complex-valued symbols.

6. The electronic device of claim 5, wherein the time-domain function is specific to the electronic device.

7. The electronic device of claim 5, wherein the time-domain function includes data.

8. The electronic device of claim 5, wherein the instructions further cause the processor to receive signaling indicating a configuration parameter defining the second RF signal.

9. The electronic device of claim 5, wherein the processor is further caused, by executing the instructions, to generate, in response to receiving signaling indicating an operating mode associated with transmitting the second RF signal, the second RF signal from the first RF signal without decoding the plurality of sub-signals.

10. A non-transitory computer-readable medium on which is stored instructions for a processor in an electronic device, the instructions, when executed by the processor, causing the processor to:
   receive a first radio frequency (RF) signal, the first RF signal including a time-domain plurality of sub-signals, each sub-signal comprising an RF-upconverted baseband signal; and
   transmit a second RF signal, the second RF signal being a time-domain function of a contiguous subset of the time-domain plurality of sub-signals in the first RF signal wherein the time-domain function includes a modulation of the contiguous subset of the sub-signals in the first RF signal according to one or more complex-valued symbols.

11. The non-transitory computer-readable medium of claim 10, wherein the time-domain function is specific to the electronic device.

12. The non-transitory computer-readable medium of claim 10, wherein the instructions further cause the processor to receive signaling indicating a configuration parameter defining the second RF signal.

13. The non-transitory computer-readable medium of claim 10, wherein the instructions further cause the processor to generate, in response to receiving signaling indicating an operating mode associated with transmitting the second RF signal, the second RF signal from the first RF signal without decoding the plurality of sub-signals.

14. A method of obtaining information about an electronic device, the method comprising:
   transmitting a first radio frequency (RF) signal, the first RF signal including a time-domain plurality of sub-signals, each sub-signal comprising an RF-upconverted baseband signal;
   receiving, from an electronic device, a second RF signal, the second RF signal being a time-domain function of a contiguous subset of the time-domain plurality of sub-signals in the first RF signal; and
   associating a cross-correlation value with each time shift value among a plurality of time shift values, the cross-correlation value obtained between the second RF signal and the first RF signal shifted by each time shift value.

15. The method of claim 14 further comprising processing the second RF signal to obtain information about the electronic device.

16. The method of claim 14 wherein the first RF signal has specific autocorrelation properties.

17. The method of claim 14 further comprising determining a particular time shift value associated with a greatest cross-correlation value among the plurality of cross-correlation values.

18. The method of claim 17 further comprising processing the particular time shift value to obtain the information about the electronic device.

19. The method of claim 18 wherein the processing the particular time shift value comprises:
   obtaining a value for a relative time difference; and
   converting the relative time difference to an indication of a position for the electronic device.

20. The method of claim 18 wherein the processing the particular time shift value comprises:
   obtaining indications of boundaries for the contiguous subset of the sub-signals received over the defined duration; and
   analyzing the boundaries to obtain an indication of a timing for the electronic device.

21. A method of operating an electronic device, the method comprising:
   receiving, by the electronic device, a first radio frequency (RF) signal, the first RF signal including a time-domain plurality of sub-signals, each sub-signal comprising an RF-upconverted baseband signal;
   in response to receiving signaling indicating an operating mode associated with transmitting the second RF signal, generating the second RF signal from the first RF signal without decoding the plurality of sub-signals, the second RF signal being a time-domain function of a contiguous subset of the time-domain plurality of sub-signals in the first RF signal; and
   transmitting, by the electronic device, the second RF signal.

\* \* \* \* \*